(12) United States Patent
Choi et al.

(10) Patent No.: US 11,775,016 B2
(45) Date of Patent: Oct. 3, 2023

(54) DISPLAY DEVICE

(71) Applicant: LG ELECTRONICS INC., Seoul (KR)

(72) Inventors: Dong Jun Choi, Seoul (KR); Hang Seok Kim, Seoul (KR); Min Chul Shin, Seoul (KR); Gil Jae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 17/625,632

(22) PCT Filed: Jul. 19, 2019

(86) PCT No.: PCT/KR2019/008991
§ 371 (c)(1),
(2) Date: Jan. 7, 2022

(87) PCT Pub. No.: WO2021/015310
PCT Pub. Date: Jan. 28, 2021

(65) Prior Publication Data
US 2022/0253103 A1  Aug. 11, 2022

(51) Int. Cl.
*G06F 1/16* (2006.01)
*G06F 1/20* (2006.01)

(52) U.S. Cl.
CPC .......... *G06F 1/1652* (2013.01); *G06F 1/1624* (2013.01); *G06F 1/1681* (2013.01); *G06F 1/203* (2013.01)

(58) Field of Classification Search
CPC .... G06F 1/1652; G06F 1/1624; G06F 1/1681; G06F 1/203; H04M 1/0237; H04M 1/026;
(Continued)

(56) References Cited

U.S. PATENT DOCUMENTS 5,448,251 A * 9/1995 Gerszberg ........... H04M 1/0216
343/903
10,747,269 B1 * 8/2020 Choi ................... H04M 1/0237
(Continued)

FOREIGN PATENT DOCUMENTS

CN      108922409      11/2018
KR   10-2014-0059274    5/2014
(Continued)

OTHER PUBLICATIONS

PCT International Application No. PCT/KR2019/008991, International Search Report dated Apr. 14, 2020, 4 pages.
(Continued)

*Primary Examiner* — Abhishek M Rathod
(74) *Attorney, Agent, or Firm* — LEE, HONG, DEGERMAN, KANG & WAIMEY PC

(57) ABSTRACT

A display device is provided. A display device according to an embodiment of the present invention comprises a body, a moving plate, a bracket, a rack, an actuator and a driving gear. The bracket, rack, actuator and driving gear are coupled to one another to form a driving module, and the bracket comprises a moving guide, an upper cover and a heat dissipation fin. According to an embodiment of the present invention, the display device can be manufactured in which the moving plate can move reciprocatively in a stable manner with respect to the body, the heat dissipation of the actuator can be effectively performed, and the thickness and size of the driving module can be minimized.

16 Claims, 19 Drawing Sheets

(58) Field of Classification Search
CPC ....... H04M 1/0268; H04N 5/645; H04N 5/65; G09F 9/301; G09F 9/30
See application file for complete search history.

(56) References Cited

U.S. PATENT DOCUMENTS

| | | | |
|---|---|---|---|
| 2009/0051830 A1 | 2/2009 | Matsushita et al. | |
| 2020/0033913 A1* | 1/2020 | Yang | H04M 1/0268 |
| 2020/0097043 A1* | 3/2020 | Kim | F16M 11/24 |
| 2020/0264660 A1* | 8/2020 | Song | H04M 1/0237 |
| 2020/0363841 A1* | 11/2020 | Kim | G06F 1/1652 |

FOREIGN PATENT DOCUMENTS

| | | |
|---|---|---|
| KR | 10-2017-0116551 | 10/2017 |
| KR | 10-2019-0004618 | 1/2019 |
| KR | 10-2019-0062855 | 6/2019 |
| KR | 20190062855 | 6/2019 |

OTHER PUBLICATIONS

European Patent Office Application Serial No. 19938221.9, Search Report dated Mar. 30, 2023, 11 pages.

\* cited by examiner

DISPLAY DEVICE

CROSS-REFERENCE TO RELATED APPLICATIONS

This application is the National Stage filing under 35 U.S.C. 371 of International Application No. PCT/KR2019/008991, filed on Jul. 19, 2019, the contents of which is hereby incorporated by reference herein in its entirety.

TECHNICAL FIELD

The present disclosure relates to a device including a display and, more specifically, to a display device including a flexible display capable of being bent, in which the area of the flexible display exposed to one side is variable.

BACKGROUND ART

As a flexible display which is bendable while displaying image information is developed, studies and developments are being conducted for a foldable type device in which a flexible display is applied to a device having two bodies and folding structures (for example, hinge units). In such a device, since the flexible display may be entirely disposed on two bodies via the folding structure so that a large size display may be implemented in the device.

As another device using the flexible display, a rollable type device in which a display has a winding structure is being studied and developed. In such a device, the flexible display is wound so that a size or an area of the entire display may be reduced and the flexible display is unwound so that the size or the area of the entire display may be increased.

In the foldable type device and the rollable type device, the flexible display is elastically deformed or elastically restored while changing the shape. Therefore, in a part of the flexible display which is deformed, springback may be generated.

When the springback of the flexible display is generated, interference or friction between the flexible display and the other part of the device may occur or the flexible display may be damaged or the operation of the device may not be smoothly performed. Therefore, it is necessary to consider to control the springback of the flexible display.

In the device using the flexible display, the movement (for example, sliding) of the flexible display may be generated. In this case, when the smooth movement is not performed or uniform tensile force is not applied to the flexible display while being moved, it is difficult to operate the device and the flexible display may be irregular or damaged.

As a related art document using a flexible display, Korean Patent No. 1107127 (hereinafter, referred to as a related art 1) discloses a mobile terminal. The related art 1 includes a flexible display in which a size of a screen exposed to the outside is variable, a driving unit, a sliding member, a first rack gear, and a second rack gear.

In the related art 1, a pinion gear is engaged with the first rack gear and the second gear and when the pinion gear rotates by a motor which configures the driving unit, the flexible display moves in a longitudinal direction.

However, the related art 1 does not specifically disclose how the driving unit and the motor are connected to the terminal body and how the driving unit and the motor are assembled with other configurations.

Therefore, when the terminal is formed by the related art 1, problems in that the pinion gear is not precisely engaged with the first rack gear and the second rack gear to be highly likely to be idle, the first rack gear and the second rack gear are slanted, the flexible display is not appropriately moved, or the flexible display is wrinkled are predictable.

Further, in the related art 1, the size of the screen of the flexible display varies by the driving of the driving unit, but a separate configuration which supports a bottom surface of the flexible display is not provided so that unevenness of the flexible display may be easily caused.

Further, in the related art 1, the first rack gear and the second rack gear are separated to be coupled to the pinion gear. However, backlash of the gear may cause the deflection of the flexible display during the operation and it is difficult to control an overall tension of the flexible display.

Further, in the related art 1, it is difficult to apply uniform tension to the flexible display and it is also difficult to control the springback in a portion where the flexible display is deformed.

It is very important to form a slim mobile terminal with various functions to improve the merchantability of the terminal. However, in the case of the related art 1, the possibility of interference between the driving unit and various components in the terminal and the assembling structure of the driving unit cannot be considered so that it is difficult to expect the improvement of the merchantability.

As another related art document using a flexible display, Korean Patent No. 1695206 (hereinafter, referred to as a related art 2) discloses a screen extendable portable terminal. In the related art 2, the flexible display is rolled around a cylindrical rotation member equipped in the housing.

The related art 2 does not disclose a configuration which supports a bottom surface of the flexible display when the screen of the flexible display rolled around the cylindrical rotation member is extended so that the flexible display may be easily irregular or deflected.

Further, in the related art 2, it is difficult to apply uniform tension to the flexible display when the screen of the flexible display rolled around the cylindrical rotation member is extended or reduced so that an excessive load may be applied to the flexible display.

Further, it is difficult to apply a winding type flexible display to a relatively small-size portable device and a radius of curvature is deformed in a wound portion so that it may be difficult to control the entire deformation of the flexible display.

When the flexible display is changed by the operation of a motor, it is necessary to prevent possible problems such as reduction in the torque and damage to the motor due to the heat of the motor, heating and damage to other components, deterioration of the emotional quality of a device, and the like. However, the aforementioned related arts 1 and 2 do not take this into account.

In particular, the related arts fail to consider a method for preventing the problems due to heat of the motor while configuring a mobile terminal with a slim structure and light weight.

DISCLOSURE OF INVENTION

Technical Problem

A task to be achieved by the present disclosure is to integrate a means for preventing a driving gear from running idle and a means for lowering the heating temperature of a driving motor when a moving plate combined with a display reciprocates relative to a body.

Another task to be achieved by the present disclosure is to provide a display device capable of improving the heat dissipation effect of a driving motor while providing a driving means for moving a display and a moving plate, which has a relatively light weight.

Another task to be achieved by the present disclosure is to provide a display device capable of modularizing a driving means for moving a display and a moving plate and minimizing the thickness and size of the driving means, thereby improving the heat dissipation effect of the driving means.

Another task to be achieved by the present disclosure is to provide a display device having a driving module capable of maintaining left-and-right balance while exerting sufficient power to move a flexible display and securing durability.

Another task to be achieved by the present disclosure is to provide a new mechanism, in configuring a display device in which the area of a flexible display exposed to any one side is continuously variable, that can apply uniform tension to the flexible display when the exposed area of the flexible display is increased and reduced.

Another task to be achieved by the present disclosure is to provide a display device with a structure in which both a portion having a fixed shape and a portion having a variable shape are stably supported and placed on the same flat or curved surface.

Another task to be achieved by the present disclosure is to provide a display device that facilitates control of springback in a portion where the flexible display is elastically deformed.

Another task to be achieved by the present disclosure is to a display device, in configuring a support means for supporting the flexible display, that facilitates deformation of the support means and prevents bending of the support means by applying a uniform tension to the support means.

Another task to be achieved by the present disclosure is to provide a display device that specifies a range in which the screen of the flexible display is expanded, thereby controlling the motor.

Solution to Problem

In order to achieve the above tasks, a display device according to the embodiment of the present disclosure may be configured as follows.

A display device may include a body, a moving plate, and a display.

A display device according to the embodiment of the present disclosure may include a bracket, a rack, an actuator, and a driving gear.

The bracket, the rack, the actuator and the driving gear may be combined with each other to configure a driving module, and the driving module may act as a driving means for moving the moving plate relative to the body.

In the embodiment of the present disclosure, the direction in which the moving plate moves relative to the body may be defined as a front-rear direction.

The moving plate may have a flat surface in the front-rear direction, and may be configured to reciprocate back and forth with respect to the body.

The display may be coupled to the moving plate such that at least a portion thereof is stacked on the outer surface of the moving plate. The display may be configured as a flexible display.

The bracket is coupled to the body.
The bracket may be made of a metallic material.
The bracket is configured to include a moving guide formed in the front-rear direction, an upper cover extending in a left-right direction from the left or right side of the moving guide and forming a concave recess, and a plurality of heat dissipation fins formed on the outer surface of the upper cover. The moving guide, the upper cover, and the heat dissipation fins may be integrally formed.

The rack is slidably coupled to the moving guide in the front-rear direction, has gears repeatedly formed along the front-rear direction, and is coupled to the moving plate.

The actuator may be coupled to the bracket.
The actuator is seated in the recess and includes a driving motor and a driving shaft rotated by the driving motor.

The driving gear is coupled to the driving shaft and is configured to mesh with the gears of the rack.

The driving module may be configured to include a lower cover.

The lower cover may be made of a metallic material and may be coupled to the bracket so as to shield and support at least a portion of the actuator seated in the recess.

That is, the bracket, the rack, the actuator, the driving gear, and the lower cover may be combined to configure a driving module.

For stable engagement between the driving gear and the gears of the rack, and for stable sliding of the rack relative to the bracket, the driving module may be coupled to the body and the moving plate after assembly.

The body may be configured to include a first holder, a second holder, and a center body.

A first rail parallel to the front-rear direction is formed on the first holder.

The second holder has a second rail formed to be spaced apart from the first holder and parallel to the first rail.

The center body is configured to connect the first holder and the second holder.

The moving plate may have a first slider formed on one side thereof to move along the first rail and a second slider formed on the opposite side thereof to move along the second rail.

The rack may be formed on the lower surface of the moving plate, and the rack may be configured to be constrained by the bracket to prevent movement thereof in the up-down direction, thereby maintaining close and stable engagement between the driving gear and the rack.

In the embodiment of the present disclosure, the direction perpendicular to the surface of the moving plate may be defined as an up-down direction. In addition, the direction in which the outer surface of the moving plate faces may be defined as an upward direction.

The bracket is configured to include the moving guide, the upper cover, and the heat dissipation fins for improvement of the heat dissipation effect, assembly rigidity, and slimming of the driving module.

The actuator may be configured to include a gear box.
The gear box may be provided between the driving motor and the driving shaft and transmit power of the driving motor to the driving shaft so that deceleration may be performed by the gear box.

A pad accommodation hole may be formed in the bracket.
The pad accommodation hole may be formed as a hole penetrating the bracket on the extension line of the recess at a position corresponding to the driving motor, and may have a length equal to or more than ½ of a length of the driving motor in a shaft direction thereof and a width equal to or greater than a radius of the driving motor.

In this case, a display device according to the embodiment of the present disclosure may be configured to include a thermal pad and a heat conduction block.

The thermal pad is placed on the pad accommodation hole.

The heat conduction block is made of a metallic material, and has a heat dissipation surface in close contact with the thermal pad and a heat absorption surface in close contact with or adjacent to the driving motor.

In the embodiment of the present disclosure, in order to increase the heat dissipation effect of the driving motor while reducing the weight of the driving means, the heat conduction block may have higher thermal conductivity than the bracket, and the bracket may have a lower density than the heat conduction block.

A display device according to the embodiment of the present disclosure may be configured to include a heat pipe.

The heat pipe may be configured to include a first heat transfer portion and a second heat transfer portion.

The first heat transfer portion may be configured in the form of a plate having one surface in close contact with the thermal pad and the opposite surface in close contact with the body and extending toward an edge of the body.

The second heat transfer portion may extend from the first heat transfer portion and may be configured in the form of a plate having one surface spaced apart from the bracket and the opposite surface in close contact with the edge of the body.

In the display device according to the embodiment of the present disclosure, heat dissipation grease may be applied to be interposed between the actuator and the bracket and between the actuator and the lower cover.

The lower cover may be configured to include a first cover area that shields a side corresponding to the driving motor and a second cover area that shields a side corresponding to the gear box and has a plurality of heat dissipation holes formed to penetrate therethrough.

In the embodiment of the present disclosure, the heat dissipation holes may be configured to be different in at least one of the size, the spacing, and the number of holes per unit area depending on the distance to the first cover area.

In the display device according to the embodiment of the present disclosure, a pair of actuators and a pair of driving gears may be provided, respectively, and may be arranged in the front-rear direction.

The bracket may be configured to include a first guide member, a second guide member, and a gear accommodation space.

A pair of first guide members and a pair of second guide members are provided, are spaced apart from each other, and the ends thereof are bent toward each other to configure the moving guide.

The gear accommodation space is a through-hole between the first guide member and the second guide member, and forms a space in which the driving gear is located.

The rack may be configured to include a first retention edge, a second retention edge, a rack body, and a plurality of gear grooves.

The first retention edge and the second retention edge are configured to be caught by the first guide member and the second guide member, respectively.

The rack body protrudes toward the moving plate between the first retention edge and the second retention edge.

The gear grooves are a plurality of grooves formed between the first retention edge and the second retention edge, constituting gears of the rack.

In the display device according to the embodiment of the present disclosure, the driving track is configured as continuous tracks by itself or together with the moving plate so as to apply uniform tension to the flexible display when the moving plate and the driving track move such that the exposed area of the flexible display exposed to one side is increased or reduced.

More specifically, the display device according to the embodiment of the present disclosure may be configured to further include a first shaft, a first support, a second shaft, a second support, and a driving track.

The first shaft is parallel to the left-right direction, is located below the moving plate, and is located at the same point as the rear end of the moving plate or at the rear thereof.

The first support is located along the first shaft.

The first support may be coupled to the body to be rotatable about the first shaft.

The second shaft is located below the moving plate, is located in front of the first shaft, and is parallel to the first shaft.

The second support is located along the second shaft.

The second support may be rotatably coupled to the body.

The moving plate may be coupled to the body to reciprocate along a moving path.

The driving track is configured to be bent in at least a portion thereof to form a closed loop arranged to closely surround the first support and the second support, and is coupled to the moving plate.

The driving track reciprocates based on the first shaft and the second shaft.

A portion of the display configured as a flexible display is coupled to the outer surface of the driving track, and a portion thereof is located below the first support and the second support when the driving track reciprocates.

A portion of the display may be coupled to the outer surface of the moving plate, and another portion thereof may be coupled to the outer surface of the driving track.

The display may include: a basic exposure area exposed to overlap the outer surface of the moving plate; and an additional exposure area, other than the basic exposure area, exposed to overlap the outer surface of the driving track.

In the display device according to the embodiment of the present disclosure, the size of the additional exposure area exposed to the same side together with the basic exposure area may be changed according to the movement of the moving plate.

The driving track may be configured to include a back plate, hinge segments, and a guide plate.

The back plate may be made of an elastic metal plate, and may be coupled to the inner surface of the flexible display.

The hinge segments may be configured to be long in the left-right direction, and a plurality of hinge segments may be provided to be consecutively arranged on the inner surface of the back plate to be coupled thereto.

The guide plate may be made of an elastic metal plate in at least a portion thereof, and have one end connected to the hinge segment and the opposite end coupled to the moving plate.

The first support and the second support may have curved surfaces in contact with the driving track.

The first support and the second support may be configured to move relative to each other in the directions away from each other.

The display device according to the embodiment of the present disclosure may be configured to further include an elastic body for elastically supporting any one of the first support and the second support in a direction away from the other.

The driving track may include a magnet, and the body may be configured to include a first Hall sensor and a second Hall sensor.

The first Hall sensor may be configured to detect an approach of the magnet when the moving plate moves forward.

The second Hall sensor may be configured to detect an approach of the magnet when the moving plate moves backwards.

In the display device according to the embodiment of the present disclosure, a rotation speed of the driving motor may be controlled according to signals sensed by the first Hall sensor and the second Hall sensor.

Advantageous Effects of Invention

According to the embodiment of the present disclosure, it is possible to provide a display device in which a bracket, a rack, an actuator, and a driving gear are included as a driving means for reciprocating the display and the moving plate, in which the bracket includes a moving guide, an upper cover, and a heat dissipation fin, and in which heat dissipation is conducted in the entire area of the bracket, thereby reducing the thickness of the driving means and providing stable operation and effective heat dissipation of the driving motor.

According to the embodiment of the present disclosure, it is possible to provide a display device in which a pad accommodation hole is formed in the bracket and in which the thermal pad and the heat conduction block are coupled in the pad accommodation hole, thereby performing intensive heat dissipation in the driving motor, which is a heat source, and obtaining effects of reducing the weight of the driving means (driving module), preventing deformation thereof, and rapidly dissipating heat.

According to the embodiment of the present disclosure, it is possible to provide a display device in which a heat dissipation hole is formed in the lower cover constituting the driving module, so that the contact area with the surrounding air is enlarged to perform effective heat conduction and so that air circulates in the driving module, resulting in an excellent heat dissipation effect.

According to the embodiment of the present disclosure, it is possible to provide a display device in which both the left side and the right side of the rack are supported by the driving module itself and in which both the left side and the right side of the moving plate are supported by the body, thereby providing excellent left-and-right balance when the moving plate moves back and forth.

According to the embodiment of the present disclosure, it is possible to provide a display device in which a pair of driving motors and a pair of driving gears are respectively provided such that the pair of driving gears is configured to mesh with a single rack located in the center, thereby providing excellent left-and-right balance while exerting sufficient power to move the display.

According to the embodiment of the present disclosure, a driving track may be disposed to surround a first support and a second support, and the driving track may be configured as continuous tracks by itself or together with the moving plate, thereby applying uniform tension to the flexible display when the exposed area of the flexible display is increased or reduced.

According to the embodiment of the present disclosure, it is possible to provide a display device in which a back plate is provided to be coupled to the inner surface of the flexible display, thereby facilitating control of springback in the elastically deformed portion of the flexible display.

According to the embodiment of the present disclosure, it is possible to provide a display device, in which a first support and a second support are configured to move relative to each other in the directions away from each other, which further includes an elastic body, thereby preventing bending of the driving track and unevenness of the flexible display.

According to the embodiment of the present disclosure, it is possible to provide a display device in which a magnet is provided in the driving track and in which a first Hall sensor and a second Hall sensor are provided in the body, thereby effectively limiting the extent to which the screen of the flexible display is extended and operating smoothly and quickly by differently controlling the speed of the driving motor depending on the time at which the screen of the flexible display starts to expand and the time at which the expansion is completed, or the time at which the screen of the flexible display starts to be reduced and the time at which the reduction is completed.

BRIEF DESCRIPTION OF DRAWINGS

FIG. 3 further illustrates the state in which portions of the insides of both a first holder and a second holder are enlarged.

In FIG. 7, the external shape of an actuator is shown while omitting the internal structure thereof.

In FIG. 8, the external shape of an actuator (driving motor) is shown while omitting the internal structure thereof.

BEST MODE FOR CARRYING OUT THE INVENTION

Figure 1:
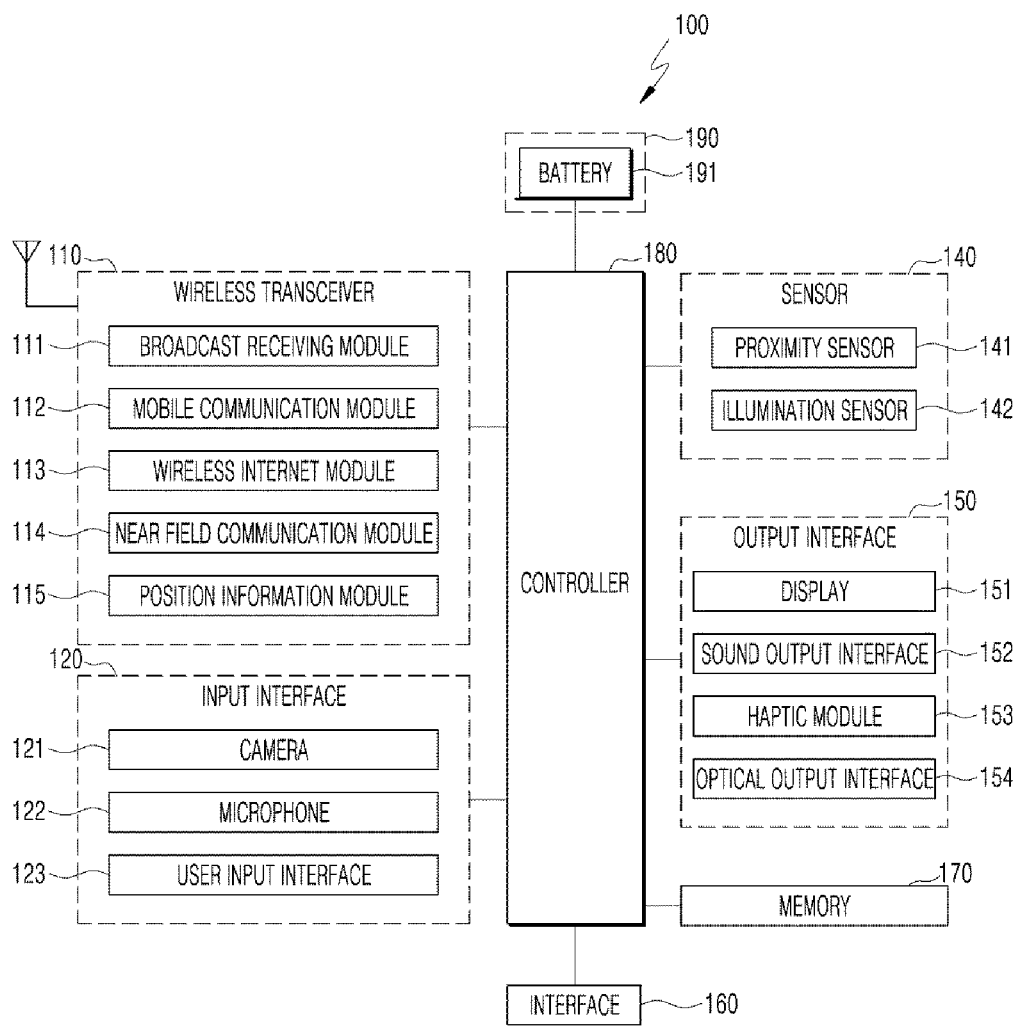
FIG. 1 is a block diagram illustrating a display device according to an embodiment of the present disclosure.

Hereinafter, embodiments disclosed the present invention will be described in detail with reference to the accompanying drawings, and the same or similar components are denoted by the same reference, and repeated description thereof will be omitted. Further, such as "module" and a "unit", suffixes for components used in the following description are given or mixed and used by considering easiness in preparing a specification and do not have a meaning or role distinguished from each other in themselves. In describing the embodiment disclosed in the present specification, when it is determined that a detailed description of a related publicly known technology may obscure the gist of the embodiment disclosed in the present specification, the detailed description thereof will be omitted. Further, the accompanying drawings are provided for more understanding of the embodiment disclosed in the present specification, but the technical spirit disclosed in the present invention is not limited by the accompanying drawings. It should be understood that all changes, equivalents, and alternatives included in the spirit and the technical scope of the present invention are included.

Terms including an ordinary number, such as first and second, are used for describing various constituent elements, but the constituent elements are not limited by the terms. The above terms are used only to discriminate one component from the other component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

A singular form may include a plural form if there is no clearly opposite meaning in the context.

In the present invention, it should be understood that terminology "include" or "have" indicates that a feature, a number, a step, an operation, a component, a part or the combination those of described in the specification is present, but do not exclude a possibility of presence or addition of one or more other features, numbers, steps, operations, components, parts or combinations, in advance.

A display device described in the present specification may include a mobile terminal such as a portable phone, a smart phone, a laptop computer, a digital broadcasting terminal, a personal digital assistant (PDA), a portable multimedia player (PMP), a navigation, a slate PC, a tablet PC, an ultrabook, a wearable device, a smartwatch, a smart glass, a head mounted display (HMD), and the like.

It will be apparent to those skilled in the art that the configuration according to the embodiment disclosed in the present specification may be applied to a fixed terminal such as a digital TV, a desktop computer, a digital signage except for an example that is applied only to a mobile terminal. Hereinafter, in the present invention, for the convenience of description, the mobile terminal will be first described as an example of the display device.

FIG. 1 is a block diagram for explaining a mobile terminal 100 according to the present invention.

The mobile terminal 100 includes a wireless communication unit 110, an input unit 120, a sensing unit 140, an output unit 150, an interface unit 160, a memory 170, a controller 180, and a power supply unit 190. Components illustrated in FIG. 1 are not essential to implement the mobile terminal so that the mobile terminal described in the present invention may include more or fewer components than the components described above.

More specifically, the wireless communication unit 110 among the components may include one or more modules which enable the wireless communication between the mobile terminal 100 and a wireless communication system, between the mobile terminal 100 and another mobile terminal 100, or between the mobile terminal 100 and an external server. Further, the wireless communication unit 110 may include one or more modules which connect the mobile terminal 100 to one or more networks.

The wireless communication unit 110 may include at least one of a broadcasting receiving module 111, a mobile communication module 112, a wireless internet module 113, a near field communication module 114, and a position information module 115.

The input unit 120 may include a camera 121 or an image input unit which inputs an image signal, a microphone 122 or an audio input unit which inputs an audio signal, and a user input unit 123 (for example, a touch key or a mechanical key) which receives information from a user. Voice data or image data collected by the input unit 120 is analyzed to be processed as a control command of the user.

The sensing unit 140 may include one or more sensors which sense at least one of information in the mobile terminal, surrounding environment information around the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121 or a microphone 122), a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, a biometric sensor, etc.). In the meantime, the mobile terminal disclosed in the present specification may combine and utilize information sensed by at least two sensors from the above-mentioned sensors.

The output unit 150 generates outputs related to vision, auditory, or tactile and may include at least one of a display unit 151, a sound output unit 152, a haptic module 153, and an optical output unit 154. The display unit 151 forms a mutual layer structure with a touch sensor or is formed integrally to be implemented as a touch screen. The touch screen simultaneously may serve as a user input unit 123 which provides an input interface between the mobile terminal 100 and the user and provides an output interface between the mobile terminal 100 and the user.

The interface unit 160 serves as a passage with various types of external devices which are connected to the mobile terminal 100. The interface unit 160 may include at least one of a wired/wireless headset port, an external charger port, a wired/wireless data port, a memory card port, a port which connects a device equipped with an identification module, an audio input/output (I/O) port, a video input/output (I/O) port, and an earphone port. The mobile terminal 100 may perform appropriate control related to the connected external device in accordance with the connection of the external device to the interface unit 160.

Further, the memory 170 may store data which supports various functions of the mobile terminal 100. The memory 170 may store a plurality of application programs (or applications) driven in the mobile terminal, data and commands for operations of the mobile terminal 100. At least some of application programs may be downloaded from the external server through wireless communication. Further, at least some of the application programs may reside on the mobile terminal 100 from the time of departure for the basic functions (for example, call incoming, call outgoing, message receiving, or message sending function) of the mobile terminal 100. In the meantime, the application program is stored in the memory 170 and is installed on the mobile terminal 100 to be driven by the controller 180 to perform an operation (or functions) of the mobile terminal.

In addition to the operation related to the application program, the controller 180 may generally control an overall operation of the mobile terminal 100. The controller 180 may process a signal, data, or information which is input or output through the above-described components or drive the application programs stored in the memory 170 to provide or process appropriate information or functions to the user.

Further, in order to drive the application program stored in the memory 170, the controller 180 may control at least some of components described with reference to FIG. 1. Moreover, the controller 180 may combine and operate at least two of components included in the mobile terminal 100 to drive the application program.

The power supply unit 190 is applied with external power or internal power to supply the power to the respective components included in the mobile terminal 100 under the control of the controller 180. The power supply unit 190 includes a battery and the battery may be an embedded battery or a replaceable battery.

At least some of the above-described components may operate in cooperation with each other to implement the operation, the control, or the control method of the mobile terminal according to various embodiments which will be described below. Further, the operation, the control, or the control method of the mobile terminal may be implemented on the mobile terminal by driving at least one application program stored in the memory 170.

Hereinafter, prior to describing various embodiments implemented by the mobile terminal 100 described above, the above-mentioned components will be described in more detail with reference to FIG. 1.

First, the wireless communication unit 110 will be described. The broadcasting receiving module 111 of the wireless communication unit 110 receives a broadcasting signal and/or broadcasting-related information from an external broadcasting management server through a broadcasting channel. The broadcasting channel may include a satellite channel and a ground wave channel. Two or more broadcasting receiving modules for simultaneous broadcasting reception or broadcasting channel switching for at least two broadcasting channels may be provided to the mobile terminal 100.

The broadcasting management sever may refer to a server which generates and transmits a broadcasting signal and/or broadcasting-related information or a server which is supplied with the previously generated broadcasting signal and/or broadcasting-related information to transmit the broadcasting signal and/or the broadcasting-related information to the terminal. The broadcasting signal includes not only a TV broadcasting signal, a radio broadcasting signal, and a data broadcasting signal, but also a broadcasting signal obtained by combining the TV broadcasting signal or the radio broadcasting signal with the data broadcasting signal.

The broadcasting signal may be encoded according to at least one of technical standards for transmitting and receiving a digital broadcasting signal (or a broadcasting schemes, for example, ISO, IEC, DVB, or ATSC) and the broadcasting receiving module 111 may receive the digital broadcasting signal using an appropriate method for the technical specification determined by the technical standards.

The broadcasting-related information may refer to information related to a broadcasting channel, a broadcasting program, or a broadcasting service provider. The broadcasting-related information may also be provided through the mobile communication network. In this case, the broadcasting-related information may be received by the mobile communication module 112.

The broadcasting-related information may exist in various types such as an electronic program guide of digital multimedia broadcasting (DMB) or an electronic service guide of a digital video broadcast-handheld (DVB-H). The broadcasting signal and/or the broadcasting-related information received by the broadcasting receiving module 111 may be stored in the memory 170.

The mobile communication module 112 may transmit and receive a wireless signal with at least one of a base station, an external terminal, and a server on a mobile communication network constructed in accordance with technical standards or communication schemes for the mobile communication (for example, global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), long term evolution advanced (LTE-A), etc.).

The wireless signal may include a voice call signal, a video call signal, or various types of data in accordance with transmission or reception of a text/multimedia message.

The wireless internet module 113 refers to a module for wireless internet connection and may be embodied in the mobile terminal 100 or installed at the outside of the mobile terminal 100. The wireless internet module 113 is formed to transmit or receive the wireless signal in the communication network in accordance with wireless internet techniques.

The wireless internet technique includes wireless LAN (WLAN), wireless fidelity (Wi-Fi), Wi-Fi direct, digital living network alliance (DLNA), wireless broadband (Wi-Bro), world interoperability for microwave access (WiMAX), high speed downlink packet access (HSDPA), high speed uplink packet access (HSUPA), long term evolution (LTE), and long term evolution-advanced (LTE-A). The wireless internet module 113 may transmit or receive data in accordance with at least one wireless internet technique within a range including internet techniques which have not been described above.

From the viewpoint that the wireless internet connection by WiBro, HSDPA, HSUPA, GSM, CDMA, WCDMA, LTE, LTE-A, etc. is performed by the mobile communication network, the wireless internet module 113 which performs the wireless internet connection through the mobile communication network may be understood as a type of the mobile communication module 112.

The near field communication module 114 is provided for short range communication and supports the near field communication using at least one of Bluetooth™ radio frequency identification (RFID), infrared data association (IrDA), ultra wideband (UWB), ZigBee, Near Field Communication (NFC), wireless fidelity (Wi-Fi), Wi-Fi Direct, Wireless Universal Serial Bus (Wireless USB). The near field communication module 114 may support wireless communication between the mobile terminal 100 and the wireless communication system, between the mobile terminal 100 and the other mobile terminal 100, or between the mobile terminal 100 and a network in which the other mobile terminal 100 (or external server) is located, through the near field wireless communication network. The near field wireless communication network may be a near field wireless personal communication network.

Here, the other mobile terminal 100 may be a wearable device (for example, a smart watch, a smart glass, or a head mounted display (HMD)) which is capable of exchanging data (or interworking) with the mobile terminal 100 according to the present invention. The near field communication module 114 may detect (or recognize) a wearable device which is communicable with the mobile terminal 100, in the vicinity of the mobile terminal 100. Moreover, when the detected wearable device is authenticated to communicate with the mobile terminal 100 according to the present invention, the controller 180 may transmit at least a part of data processed in the mobile terminal 100 to the wearable device through the near field communication module 114. Therefore, the user of the wearable device may use the data processed in the mobile terminal 100 through the wearable device. For example, according to this, when a phone call is received to the mobile terminal 100, the user may make a phone call through a wearable device or when a message is received to the mobile terminal 100, the user may check the received message through the wearable device.

The position information module 115 is a module for obtaining a position (or a current position) of the mobile terminal and a representative example thereof is a global positioning system (GPS) module or a wireless fidelity (Wi-Fi) module. For example, when the GPS module is utilized, the mobile terminal may obtain the position of the mobile terminal using a signal transmitted from the GPS satellite. As another example, when the Wi-Fi module is utilized, the mobile terminal may obtain the position of the mobile terminal based on information of a wireless access point (AP) which transmits and receives wireless signals with the Wi-Fi module. If necessary, the position information module 115 may perform any function of another module of the wireless communication unit 110 to substitutably or additionally obtain data on the position of the mobile terminal. The position information module 115 is a module used to obtain a position (or a current position) of the mobile terminal and is not limited to a module which directly calculates or obtains the position of the mobile terminal.

Next, the input unit 120 is provided to input video information (or signal), audio information (or signal), data, or information input from the user and in order to input the video information, the mobile terminal 100 may include one or a plurality of cameras 121. The camera 121 processes an image frame such as a still image or a moving image obtained by an image sensor in a video call mode or a photographing mode. The processed image frame may be displayed on the display unit 151 or stored in the memory 170. In the meantime, the plurality of cameras 121 equipped in the mobile terminal 100 may be disposed to form a matrix structure and a plurality of image information having various angles or focal points may be input to the mobile terminal 100 through the cameras 121 which form the matrix structure. Further, the plurality of cameras 121 may be disposed to have a stereo structure to obtain a left image and a right image to implement a stereoscopic image.

The microphone 122 processes an external sound signal as electrical voice data. The processed voice data may be utilized in various forms in accordance with a function which is being performed by the mobile terminal 100 (or an application program which is being executed). In the meantime, in the microphone 122, various noise removal algorithms which remove a noise generated during the process of receiving the external sound signal may be implemented.

The user input unit 123 receives information from the user and when the information is input through the user input unit 123, the controller 180 may control the operation of the mobile terminal 100 so as to correspond to the input information. The user input unit 123 may include a mechanical input unit (or a mechanical key, for example, a button located on a front, rear, or side surface of the mobile terminal 100, a dome switch, a jog wheel, a jog switch, etc.) and a touch type input unit. For example, the touch type input unit may be formed by a virtual key, a soft key, or a visual key which is displayed on the screen through a software process or a touch key which is disposed on a portion other than the touch screen. In the meantime, the virtual key or the visual key may be displayed on the touch screen with various shapes, and for example, may be formed by graphics, texts, icons, video, or a combination thereof.

In the meantime, the sensing unit 140 senses at least one of information in the mobile terminal, surrounding environment information around the mobile terminal, and user information and generates a sensing signal corresponding to the information. The controller 180 may control the driving or the operation of the mobile terminal 100 or perform data processing, functions, or operations related to the application program installed in the mobile terminal 100, based on the sensing signal. Representative sensors among various sensors which may be included in the sensing unit 140 will be described in more detail.

First, the proximity sensor 141 is a sensor which senses the presence of an object which approaching a predetermined sensing surface or nearby objects using an electromagnetic field force or infrared ray without any mechanical contact. The proximity sensor 141 may be disposed in an internal area of the mobile terminal which is enclosed by the above-described touch screen or in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, etc. When the touch screen is a capacitive type, the proximity sensor 141 may be configured to detect the proximity of the object with a change in the electric field in accordance with the proximity of the object having conductivity. In this case, the touch screen (or the touch sensor) itself may be classified as a proximity sensor.

In the meantime, for the convenience of description, when an object approaches onto the touch screen without being contacted to be recognized that the object is located on the touch screen, it is referred to as a "proximity touch" and when the object actually touches the touch screen, it is referred to as "contact touch". A position that the object proximately touches the touch screen refers to a position that when the object proximately touches, the object vertically corresponds to the touch screen. The proximity sensor 141 may sense proximate touch and a proximate touch pattern (for example, a proximate touch distance, a proximate touch direction, a proximate touch speed, a proximate touch time, a proximate touch position, a proximate touch movement state, etc.). In the meantime, as described above, the controller 180 may process data (or information) corresponding to the proximate touch operation and the proximate touch pattern sensed by the proximity sensor 141 and may further output visual information corresponding to the processed data on the touch screen. Furthermore, the controller 180 may control the mobile terminal 100 to process different operation or data (or information) depending on whether the touch on the same point on the touch screen is proximity touch or contact touch.

The touch sensor senses touch (or a touch input) applied to the touch screen (or the display unit 151) using at least one of various touch types such as a resistive film type, a capacitive type, an infrared type, an ultrasonic type, and a magnetic field type.

For example, the touch sensor may be configured to convert a change of a pressure which is applied to a specific portion of the touch screen or a capacitance which is generated in a specific portion into an electrical input signal. The touch sensor may be configured to detect a position and an area where a touch subject which applies touch onto the touch screen is touched on the touch sensor and a capacitance at the time of touch. Here, the touch subject is an object which applies touch to the touch sensor and for example, may include a finger, a touch pen, a stylus pen, a pointer, etc.

As described above, when there is the touch input to the touch sensor, corresponding signals are transmitted to a touch controller. The touch controller processes the signal(s) and then transmits corresponding data to the controller 180. By doing this, the controller 180 may confirm which area of the display unit 151 is touched. Here, the touch controller may be a separate component from the controller 180 or the controller 180 itself.

In the meantime, the controller 180 may perform different control or the same control depending on a type of a touch subject which touches the touch screen (or a touch key equipped other than the touch screen). Whether to perform the different control or the same control depending on the type of touch subject may be determined in accordance with an operating state of the current mobile terminal 100 or an application program which is being executed.

In the meantime, a touch sensor and a proximity sensor described above may independently or combinationally sense various types of touch on the touch screen, such as short (or tab) touch, long touch, multi touch, drag touch, flick touch, pinch-in touch, pinch-out touch, swipe touch, or hovering touch.

The ultrasonic sensor may recognize position information of a sensing object using an ultrasonic wave. In the meantime, the controller 180 may calculate a position of a wave generating source by information sensed by the optical sensor and the plurality of ultrasonic sensors. A position of the wave generating source may be calculated using a property that the light is much faster than the ultrasonic wave, that is, a time that light reaches the optical sensor is much faster than a time that the ultrasonic wave reaches an ultrasonic sensor. More specifically, the position of the wave generating source may be calculated using a time difference from a time that the ultrasonic wave reaches, with respect to light which serves as a reference signal.

In the meantime, as seen from the configuration of the input unit 120, the camera 121 includes at least one of a camera sensor (for example, a CCD or a CMOS), a photo sensor (or an image sensor), and a laser sensor.

The camera 121 and the laser sensor may be combined to sense a touch of a sensing object for a three-dimensional stereoscopic image. The photo sensor which is laminated on a display element is configured to scan a motion of a sensing object proximate to the touch screen. More specifically, the photo sensor is formed by mounting photo diodes and transistors (TR) in rows/columns to scan contents which are disposed on the photo sensor using an electrical signal which changes in accordance with an amount of light applied to the photo diode. That is, the photo sensor calculates a coordinate of a sensing object in accordance with a changed amount of light and position information of the sensing object may be obtained through the coordinate.

The display unit 151 displays (outputs) information processed in the mobile terminal 100. For example, the display unit 151 may display execution screen information of an application program driven in the mobile terminal 100 and user interface (UI) and graphic user interface (GUI) information in accordance with the execution screen information.

Further, the display unit 151 may be configured as a stereoscopic display unit which displays a stereoscopic image.

A three-dimensional display type such as a stereoscopic type (a glass type), an autostereoscopic type (a glass-free type), a projection type (a holographic type) may be applied to the stereoscopic display unit.

The sound output unit 152 may output audio data received from the wireless communication unit 110 or stored in the memory 170 in a call signal reception mode, a phone-call mode or a recording mode, a voice recognition mode, or a broadcasting reception mode. The sound output unit 152 may also output a sound signal related to a function (for example, a call signal reception sound or a message reception sound) performed in the mobile terminal 100. Such a sound output unit 152 may include a receiver, a speaker, a buzzer, etc.

The haptic module 153 may generate various tactile effects that the user may feel. A representative example of the tactile effect generated by the haptic module 153 may be vibration. An intensity and a pattern of the vibration generated in the haptic module 153 may be controlled by the selection of the user or a setting of the controller 180. For example, the haptic module 153 may compose different vibrations to output the composed vibrations or sequentially output the different vibrations.

In addition to the vibration, the haptic module 153 generates various tactile effects such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect by means of direct contact, but also implement to allow the user to feel the tactile effect by muscular sensation of a finger or an arm. Two or more haptic modules 153 may be provided in accordance with a configuration aspect of the mobile terminal 100.

The optical output unit 154 outputs a signal for notifying occurrence of an event using light of a light source of the mobile terminal 100. Examples of event generated in the mobile terminal 100 may be message reception, call signal reception, missed call, alarm, schedule notification, email reception, information reception through an application, etc.

The signal output from the optical output unit 154 is implemented as the mobile terminal emits single color or a plurality of color light to a front surface or a rear surface. When the mobile terminal senses the event confirmation of the user, the signal output may be completed.

The interface unit 160 serves as a passage with all external devices which are connected to the mobile terminal 100. The interface unit 160 receives data from the external device or is supplied with the power source to transmit the power source to each component in the mobile terminal 100 or transmits data in the mobile terminal 100 to the external device. For example, the interface unit 160 may include a wired/wireless headset port, an external charger port, a wired/wireless data port, a memory card port, a port which connects a device equipped with an identification module, an audio input/output (I/O) port, a video input/output (I/O) port, an earphone port, etc.

In the meantime, the identification module is a chip in which various information for authenticating a usage right of the mobile terminal 100 is stored and may include a user identity module (UIM), a subscriber identify module (SIM) an universal subscriber identify module (USIM), etc. The device with an identification module (hereinafter, "identification device" may be manufactured as a smart card type. Therefore, the identification device may be connected to the terminal 100 through the interface unit 160.

When the mobile terminal 100 is connected to an external cradle, the interface unit 160 may serve as a passage through which the power is supplied from the cradle to the mobile terminal 100 or a passage through which various command signals are transmitted to the mobile terminal 100. Various command signals or the power input from the cradle may operate a signal for recognizing that the mobile terminal 100 is precisely mounted in the cradle.

The memory 170 may store a program for an operation of the controller 180 or temporarily store input/output data (for example, a phone book, a message, a still image, a moving image, etc.). The memory 170 may store data on a vibration or a sound of various patterns output when the touch is input onto the touch screen.

The memory 170 may include at least one type of storage medium of a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

In the meantime, as described above, the controller 180 may control an operation related to the application program and an overall operation of the mobile terminal 100. For example, when the state of the mobile terminal satisfies a predetermined condition, the controller 180 may execute or release a locking state which restricts an input of a control command of a user for the applications.

Further, the controller 180 may perform control and processing related to voice call, data communication, and video call or perform a pattern recognition process which recognizes a handwriting input or a picture drawing input performed on the touch screen as a text or an image, respectively. Moreover, the controller 180 may control any one or a combination of a plurality of components described above to implement various embodiments which will be described below on the mobile terminal 100 according to the present invention.

The power supply unit 190 is applied with an external power or an internal power by the control of the controller 180 to supply the power required for operations of components. The power supply unit 190 includes a battery and the battery may be a chargeable embedded battery and detachably coupled to the terminal body to be charged.

Further, the power supply unit 190 includes a connection port and the connection port may be configured as one example of an interface unit 160 to which an external charger which supplies a power to charge a battery is electrically connected.

As another example, the power supply unit 190 may be configured to wirelessly charge the battery without using the connection port. In this case, the power supply unit 190 may receive the power using one or more of an inductive coupling method based on a self-induction phenomenon and a magnetic resonance coupling method based on an electromagnetic resonance phenomenon.

In the meantime, hereinafter, various embodiments may be implemented in a recording medium readable by a computer or a similar device using hardware, software, or a combination thereof.

The display unit 151 may include at least one of a liquid crystal display (LCD), a thin film transistor liquid crystal display (TFT LCD), an organic light emitting diode (OLED), a flexible display, a three-dimensional display (3D display), and an electronic ink display (e-ink display).

Further, two or more display units 151 may be provided in accordance with an implementation type of the mobile terminal 100. In this case, a plurality of display units may be disposed to be spaced apart from each other or integrally disposed on one surface of the mobile terminal 100 or may be disposed on different surfaces.

The display unit 151 may include a touch sensor which senses touch on the display unit 151 so as to receive the control command by the touch method. Therefore, when the touch is made on the display unit 151, the touch sensor senses the touch and the controller 180 generates a control command corresponding to the touch based on the touch. Contents input by the touch method may be letters or numbers, instructions in various modes, menu items which may be designated, or the like.

The microphone 122 is configured to receive a voice of the user or other sounds. The microphone 122 is equipped in a plurality of locations to receive stereo sounds.

The interface unit 160 serves as a passage through which the mobile terminal 100 is connected to the external device. For example, the interface unit 160 may be at least one of a connection terminal for connection with other devices (for example, an earphone or an external speaker), a port for near field communication (for example, an infrared port (IrDA port), a Bluetooth port, a wireless LAN port, etc.), and a power supply terminal for supplying a power to the mobile terminal 100. The interface unit 160 may be implemented as a socket type which accommodates an external card such as a subscriber identification module (SIM), a user identity module (UIM), and a memory card for information storage.

At least one antenna for wireless communication may be provided in a terminal body. The antenna may be embedded in the terminal body or formed in a case. For example, the antenna which forms a part of the broadcasting receiving module 111 (see FIG. 1) may be configured to be drawn from the terminal body. Alternatively, the antenna is formed to be a film type to be attached onto an inner surface of a housing or a case including a conductive material may serve as an antenna.

The terminal body includes the power supply unit 190 (see FIG. 1) which supplies the power to the mobile terminal 100. The power supply unit 190 may be embedded in the terminal body or include a battery 191 which is configured to be detachable at the outside of the terminal body.

The battery 191 may be configured to be supplied with the power through a power cable connected to the interface unit 160. Further, the battery 191 may be configured to be wirelessly chargeable by a wireless charging device. The wireless charging may be implemented by a self-induction method or a resonance method (magnetic resonance method).

An accessory which protects an outer appearance or supports or extends the function of the mobile terminal 100 may be added to the mobile terminal 100. An example of the accessory may include a cover or a pouch which covers at least one surface of the mobile terminal 100 or accommodates the mobile terminal 100. The cover or the pouch may interwork with the display unit 151 to extend the function of the mobile terminal 100. Another example of the accessory may include a touch pen which supports or extends a touch input on the touch screen.

Figure 2A:
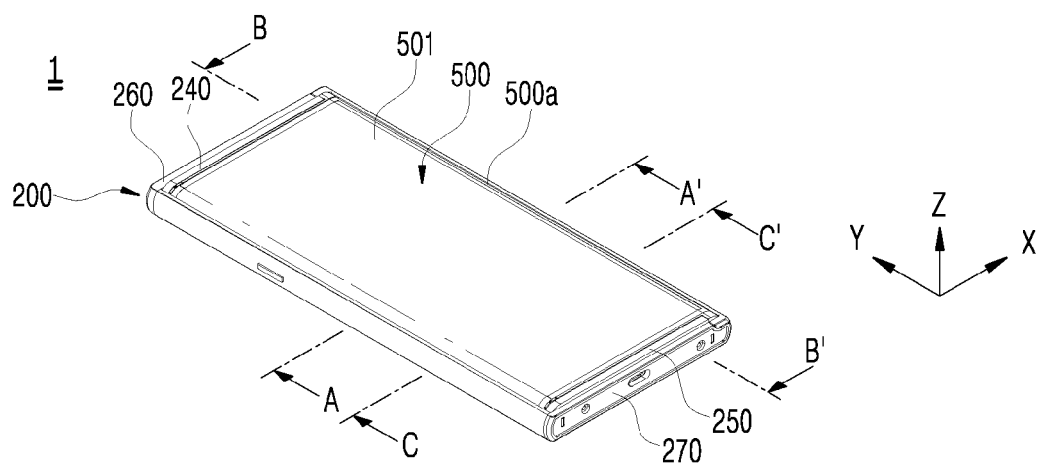
FIG. 2A is a perspective view illustrating a display device according to another embodiment of the present disclosure.
Figure 2B:
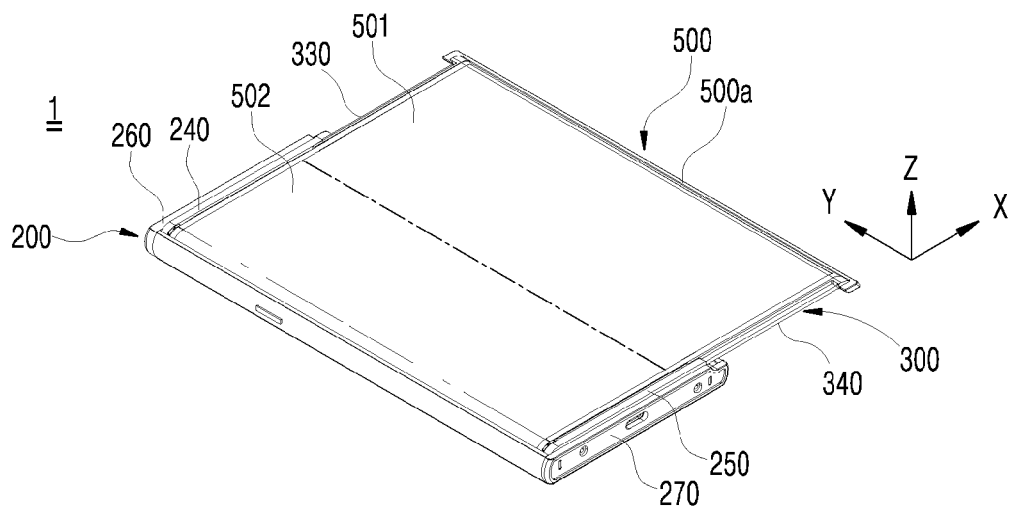
FIG. 2B is a perspective view illustrating the state in which the display device shown in FIG. 2A is changed such that the area of a flexible display exposed to the top is expanded.

FIG. 2A is a perspective view illustrating a display device 1 according to another embodiment of the present invention. FIG. 2B is a perspective view illustrating that an area of a flexible display 500 exposed from an upper portion of the display device 1 illustrated in FIG. 2A varies to extend.

In the description of the embodiments of the present invention, it is understood that a front-rear direction is a direction that the moving plate 300 reciprocates with respect to the body 200, an up-down direction is a direction which is perpendicular to a surface formed by the moving plate 300, and a left-right direction is a direction which is orthogonal to the front-rear direction and the up-down direction.

Hereinafter, in the description of the embodiments of the present invention, an X-direction, a Y-direction, and a Z-direction illustrated in the drawings are orthogonal to each other. In the description of the display device 1 according to the embodiments of the present invention, it is understood that the front-rear direction is parallel to the X-direction, the up-down direction is parallel to the Z-direction, and the left-right direction is parallel to the Y-direction.

The inside refers to a relative inside of the display device 1 and the outside refers to a relative outside of the display device 1.

The display device 1 according to the embodiment of the present invention includes a flexible display 500 which is deformable by an external force.

The deformation may be at least one of warping, bending, folding, twisting, rolling, and spreading of the display module. The deformable display module may be referred to as a "flexible display". Here, the flexible display 500 may include all a general flexible display, an electronic paper (e-paper) and a combination thereof.

The general flexible display refers to a durable display which is manufactured on a thin and flexible substrate which can be warped, bent, folded, twisted, rolled, and spread like a paper while maintaining a characteristic of a flat panel display of the related art to have a lightweight and is not easily broken.

Further, the electronic paper is a display technique to which a characteristic of a general ink is applied, but the electronic paper uses reflection light which is different from the flat panel display of the related art. The electronic paper may change information using a twist ball or electrophoresis using a capsule.

Information displayed on the flexible display 500 may include visual information which is output on a curved surface. The visual information is implemented by independently controlling the light emission of unit pixels (sub pixels) disposed in a matrix. The unit pixel refers to a minimum unit which implements one color.

A part of the flexible display 500 may be not flat but may be bent. In this case, when an external force is applied to the flexible display 500, a part of the flexible display 500 may be deformed into a flat state or a less bent state or a more bent state.

In the meantime, the flexible display 500 is combined with a touch sensor to implement a flexible touch screen. When the touch is made on the flexible touch screen, the controller 180 (see FIG. 1) performs control corresponding to the touch input. The flexible touch screen is formed such that the touch input is sensed while a part of the flexible display 500 is spread or bent.

In the meantime, the display device 1 according to the modified example may include a deformation sensing unit which senses deformation of the flexible display 500. The deformation sensing unit may be included in the sensing unit 140 (see FIG. 1).

The deformation sensing unit may be provided in the flexible display 500 or the body 200 to sense information related to the deformation of the flexible display 500. Here, the information related to the deformation may be a deformed direction of the flexible display 500, how much the flexible display 500 deformed, the deformed position, the deformed time, an acceleration that the deformed flexible display 500 is restored, and the like. Further, various information which can be sensed by the bending of the flexible display 500 may also be included.

Further, the controller 180 (see FIG. 1) may change information disposed on the flexible display 500 or generate a control signal for controlling a function of the display device 1, based on the information related to the deformation of the flexible display 500 sensed by the deformation sensing unit.

The deformation of the state of the flexible display 500 is not limited to the deformation by the external force. For example, when a part of the flexible display 500 is unfolded, the part may be deformed to be bent by the command of the user or an application.

The body 200 may form an overall outer appearance of the display device 1, may be relatively solid, and formed of plastic or metal or formed to include the same. Other components which form the display device 1 may be coupled to the body 200.

The body 200 may be formed to have various shapes which support other configurations coupled thereto.

The body 200 may be entirely formed to have a flat shape or curved shape like a curved surface. The body 200 may be entirely filled therein or a part thereof is not filled. Surfaces which form the body 200 may be flat surfaces or curved surfaces. When there is an edge of the body, the edge may form a straight line or a curved line. Further, when there is a vertex of the body 200, the vertex may be a right angle, an acute angle, or an obtuse angle.

For example, as illustrated in FIGS. 2A and 2B, when viewed from above (Z-direction), the body 200 entirely forms a quadrangular shape or also entirely forms a flat shape.

The flexible display 500 is coupled onto the body 200 so that a part thereof is exposed in the upward direction (Z-direction) and the other part is not exposed in the upward direction. As illustrated in FIG. 2A, when a part of an outer surface of the flexible display 500 is exposed in the upward direction, it is referred to as a first state, or a first position (see FIG. 2A).

When the flexible display 500 is deformed while a front end 500a of the flexible display 500 exposed upward further moves to the front side (X-direction), an area of the flexible display 500 which is exposed in the upward direction may be increased. As illustrated in FIG. 2B, when the flexible display 500 in the first state moves to the front side so that the exposed area of the flexible display 500 is extended, it is referred to as a second state, or a second position.

As described above, the shape of the display device 1 according to the embodiment of the present invention may vary between the first state and the second state. When viewed from above, the flexible display 500 having a relatively small size (area) is exposed in the first state and the flexible display 500 having a relatively large size (area) is exposed in the second state.

In the display device 1 according to the embodiment of the present invention, a front end portion 500a of the flexible display 500 which is exposed in the upward direction is not visually blocked, but a rear end portion 500b is visually blocked (see FIG. 2A). That is, a part of the flexible display 500 may be blocked by a rear border of the body 200. In this case, the flexible display 500 may not be visually exposed on a lower surface (a lower portion of the body 200, an opposite side in the Z-direction) of the display device 1.

When viewed from above, a left border and a right border of the body 200 may be formed to guide the flexible display 500 to smoothly move in the front-rear direction.

For example, a first holder 240 in which a first rail 241 open toward the right side is formed at the left border of the body 200 is formed along the front-rear direction and a second holder 250 in which a second rail 251 open toward the left side is formed at a right border of the body 200 is formed along the front-rear direction.

A left edge of the flexible display 500 or a left edge (a first slider 330) of the moving plate 300 to be described below to which the flexible display 500 is coupled may be inserted in the first rail 241. A right edge of the flexible display 500 or a right edge (a second slider 340) of the moving plate 300 to be described below to which the flexible display 500 is coupled may be inserted in the second rail 251.

Figure 2C:
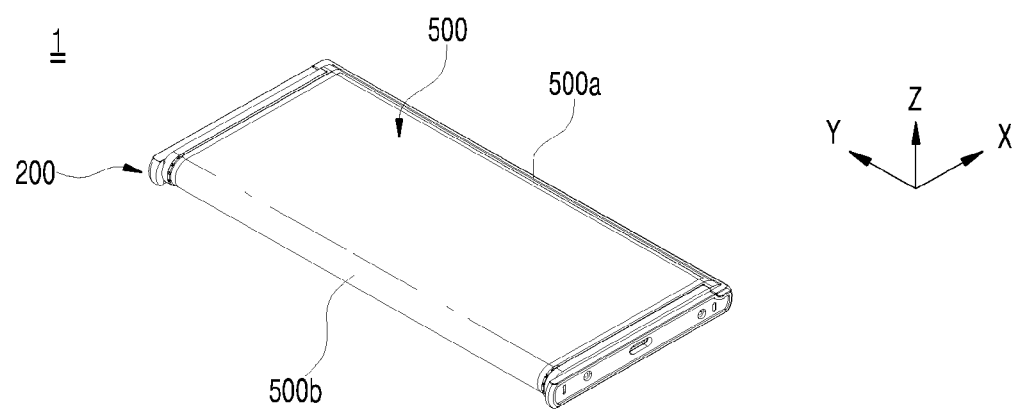
FIG. 2C is a perspective view illustrating a display device according to another embodiment of the present disclosure.

In the display device 1 according to the embodiment of the present invention, a front end portion 500a of the flexible display 500 which is exposed in the upward direction may not be blocked, and the rear end portion 500b may not be visually blocked (see FIG. 2C). That is, the flexible display 500 which is entirely flat is exposed in the upward direction and the rear end portion 500b of the flexible display 500 which has a predetermined curvature and is rounded may be exposed at the rear side.

Moreover, at least a part of the flexible display 500 may be visually exposed on the rear surface (lower portion of the body 200) of the display device 1 and a lower surface of the body 200 does not visually shield the flexible display 500 so that the flexible display 500 may also be exposed from the lower portion.

Figure 3:
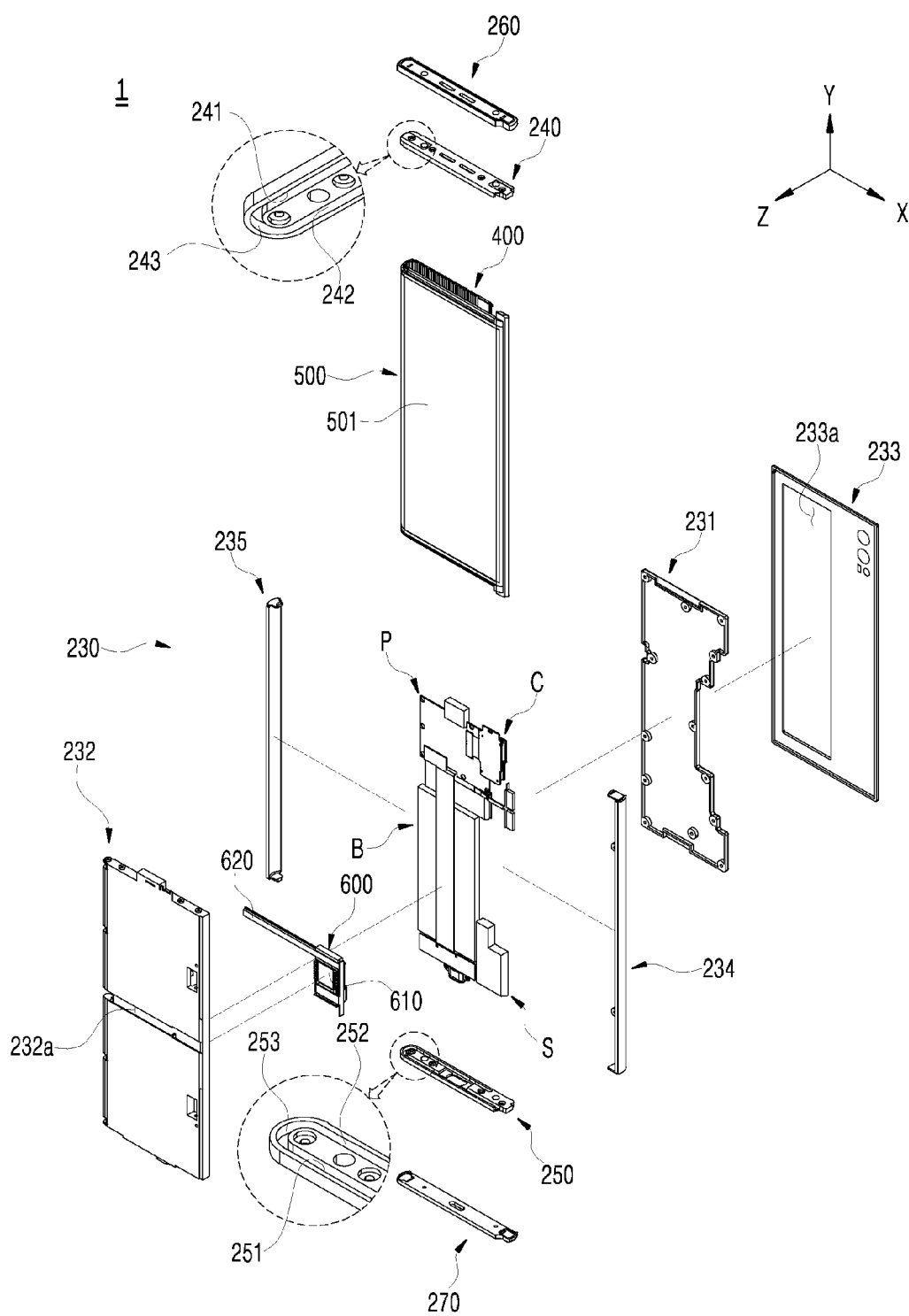
FIG. 3 is an exploded perspective view illustrating the display device shown in FIG. 2A.

FIG. 3 is an exploded perspective view illustrating a display device 1 illustrated in FIG. 2A.

The body 200 includes a center body 330, a first holder 240, and a second holder 250.

Further, the body 200 may include a first frame 260, a second frame 270, a third frame 234, and a fourth frame 235.

Further, the body 200 may include a back cover 233. The back cover 233 may form a rear-most surface of the display device 1.

The back cover 233 includes a window 233a. The window 233a may be formed as a hole which passes through the back cover 233 or a transparent panel.

According to an embodiment of the present invention, the flexible display 500 may be exposed on a lower surface of the display device 1, for example, the flexible display 500 may be exposed from the lower portion through the window 233a.

The center body 230 may form a center of the body 200 and include various parts of the display device 1.

The center body 230 may include a lower cover 231 and an upper cover 232.

The lower cover 231 and the upper cover 232 are formed to be coupled to each other and the components of the display device 1 may be accommodated in an inner space formed when the lower cover 231 and the upper cover 232 are coupled to each other.

For example, as illustrated in FIG. 3, a main PCB (P), a battery (B), a speaker (S), and a camera (C) may be accommodated and coupled between the lower cover 231 and the upper cover 232.

In the display device 1 according to the embodiment of the present disclosure, the bracket 610 may be coupled to the center body 230 and may also be coupled to the upper cover 232. The bracket 610 may be coupled to the lower surface of the upper cover 232, and in this case, a long hole 232a may be formed on the upper cover 232 in the front-rear direction, so that the rack 620 may be exposed through the hole 232a when viewed from above the upper cover 232.

The first frame 260, the second frame 270, the third frame 234, and the fourth frame 235 may be combined to form a rectangular frame shape.

The first frame 260 forms a left frame of the body 200, the second frame 270 forms a right frame of the body 200, and the third frame 234 forms a front frame of the body 200, and the fourth frame 235 forms a rear frame of the body 200.

The third frame 234 may be coupled to the front of the center body 230, and the fourth frame 235 may be coupled to the rear of the center body 230.

The first holder 240 may form a left edge of the body 200 together with the first frame 260.

A first rail 241 is formed in the first holder 240 to be parallel to the front-rear direction. The first rail 241 may be configured on the form of a concave groove on the inner surface of the first holder 240. A first slider 330 configuring the edge of the moving plate 300 is inserted into the first rail 241 so that the moving plate 300 stably moves relative to the body 200 in the front-rear direction.

First auxiliary rails 242 and 243 may be formed on the first holder 240. The first auxiliary rails 242 and 243 are configured in the form of a concave groove on the inner surface of the first holder 240 so as to be connected to the first rail 241. That is, the first rail 241 and the first auxiliary rails 242 and 243 are formed to be continuous with each other.

The first auxiliary rails 242 and 243 may be divided into a first straight section 242 and a first curved section 243. The first straight section 242 is parallel to the first rail 241 and is formed in the front-rear direction.

The first curved section 243 is located at the rear end of the first straight section 242 to have a semicircular shape, and naturally connects the first straight section 242 and the first rail 241 at the rear thereof.

An edge of the driving track 400 are inserted into the first auxiliary rails 242 and 243, and in particular, the left end (e.g., 412a) of each hinge segment 411, 412, or 413 is inserted thereinto. (See FIG. 7)

Since the first auxiliary rails 242 and 243 and the first rail 241 are formed to be continuous, the left ends 412a of the hinge segments 412 may enter the first rail 241 by passing through the first auxiliary rails 242 and 243.

The first frame 260 is coupled to the outer side of the first holder 240.

The second holder 250 may be spaced apart from the first holder 240 to be parallel thereto, and an inner surface thereof may be symmetrical to the first holder 240.

The second holder 250 may configure a right edge of the body 200 together with the second frame 270.

A second rail 251 is formed on the second holder 250 to be parallel to the front-rear direction. The second rail 251 may be configured in the form of a concave groove on the inner surface of the second holder 250. A second slider 340 configuring the edge of the moving plate 300 is inserted into the second rail 251 so that the moving plate 300 stably moves relative to the body 200 in the front-rear direction.

Second auxiliary rails 252 and 253 may be formed on the second holder 250. The second auxiliary rails 252 and 253 are configured in the form of a concave groove on the inner surface of the second holder 250, and are connected to the second rail 251. That is, the second rail 251 and the second auxiliary rail 252 and 253 are formed to be continuous with each other.

The second auxiliary rails 252 and 253 may be divided into a second straight section 252 and a second curved section 253. The second straight section 252 is parallel to the second rail 251 and is formed in the front-rear direction.

The second curved section 253 is located at the rear end of the second straight section 252 to have a semicircular shape, and naturally connects the second straight section 252 and the second rail 251 at the rear thereof.

An edge of the driving track 400 is inserted into the second auxiliary rails 252 and 253, and in particular, the right end (e.g., 412b) of each hinge segment 411, 412, or 413 is inserted thereto. (See FIG. 7)

Since the second auxiliary rails 252 and 253 and the second rail 251 are formed to be continuous, the right ends 412b of the hinge segments 412 may enter the second rail 251 by passing through the second auxiliary rails 252 and 253.

The second frame 270 is coupled to the outer side of the second holder 250.

The center body 230 is configured to connect the first holder 240 and the second holder 250. The first holder 240 is coupled to the left end of the center body 230, and the second holder 250 is coupled to the right end of the center body 230.

Figure 4:
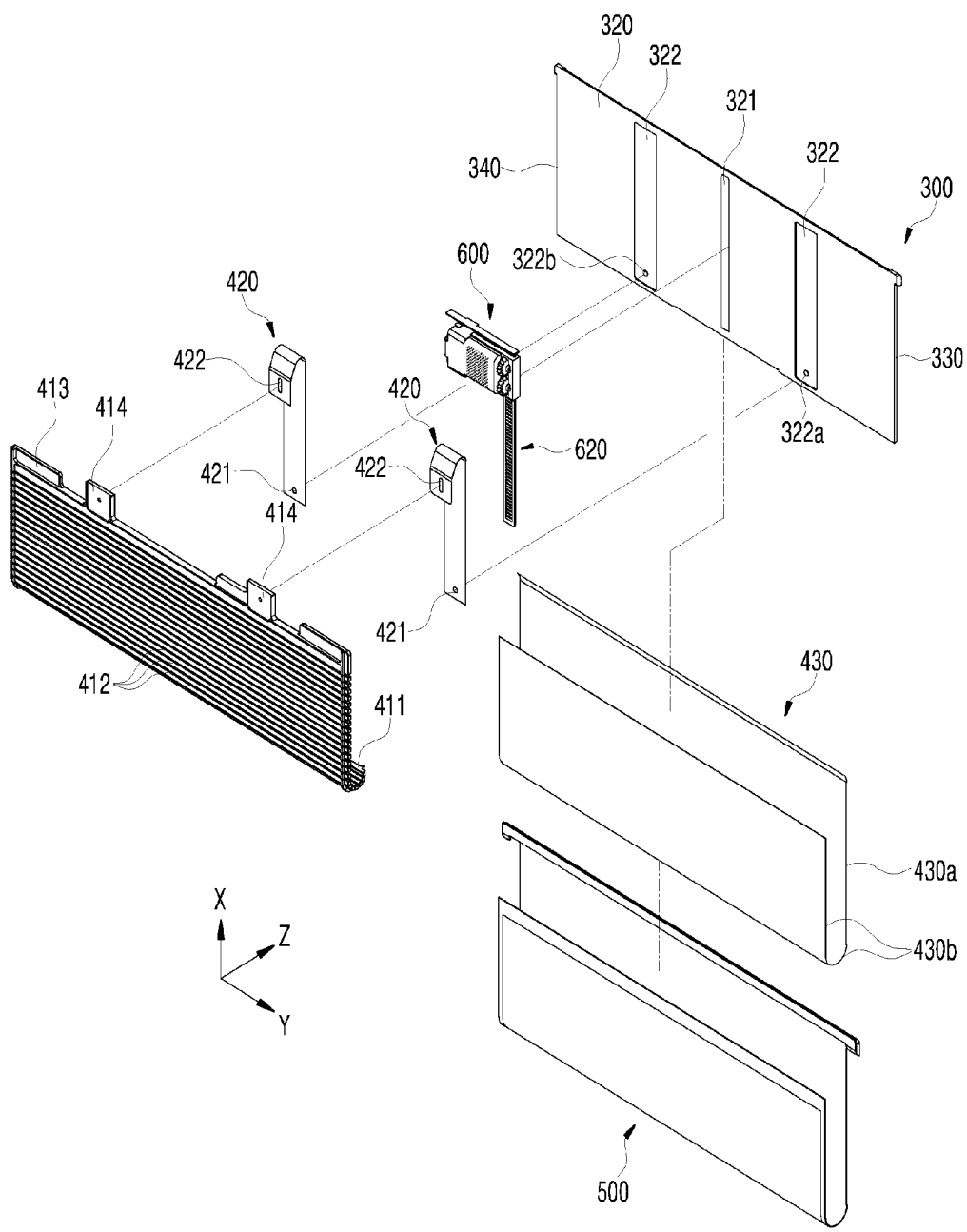
FIG. 4 is an exploded perspective view illustrating some configurations shown in FIG. 3.

FIG. 4 is an exploded perspective view illustrating some configurations shown in FIG. 3.

In the display device 1 according to the embodiment of the present disclosure, the moving plate 300 may be made of a hard material so as to maintain its shape. The moving plate 300 may be made of metal or plastic, or may be configured to include the same.

In the display device 1 according to the embodiment of the present disclosure, the moving plate 300 may be configured in the form of a flat plate overall along the front-rear direction and left-right direction.

The flexible display 500 is stacked on and coupled to the outer surface (upper surface) of the moving plate 300. The overall outer surface of the moving plate 300 may be configured to be flat along the front-rear direction and left-right direction.

The flexible display 500 may be directly coupled to the outer surface 310 of the moving plate 300, or may be coupled to the outer surface 310 of the moving plate 300 through other means.

In the embodiment of the present disclosure, a back plate 430 may be coupled to be interposed between the flexible display 500 and the moving plate 300. That is, the back plate 430 may be stacked on and coupled to the inner surface of the flexible display 500, and the back plate 430 may be stacked on and coupled to the outer surface 310 of the moving plate 300, so that the flexible display 500 and the moving plate 300 may be combined.

A rack receptacle 321 may be provided on the inner surface (lower surface) 320 of the moving plate 300. The rack receptacle 321 may be configured in the form of a concave groove on the inner surface (lower surface) 320 of the moving plate 300. The rack receptacle 321 is formed at the center of the moving plate 300 based on the left-right direction. As the rack 620 of the driving module 600 is received in the rack receptacle 321 so that the rack 620 and the moving plate 300 are coupled to each other. The coupling of the rack 620 and the moving plate 300 may be performed by fastening means such as bolts, rivets, etc., or by hooking, welding, or the like.

A guide groove 322 may be formed on the inner surface 320 of the moving plate 300. A pair of guide grooves 322 may be provided, and the guide grooves may be provided on the left and right sides of the rack receptacle 321, respectively.

The moving plate 300 may have a first slider 330 formed on one side thereof to move along the first rail 241 and a second slider 340 formed on the opposite side thereof to move along the second rail 251.

Figure 5:
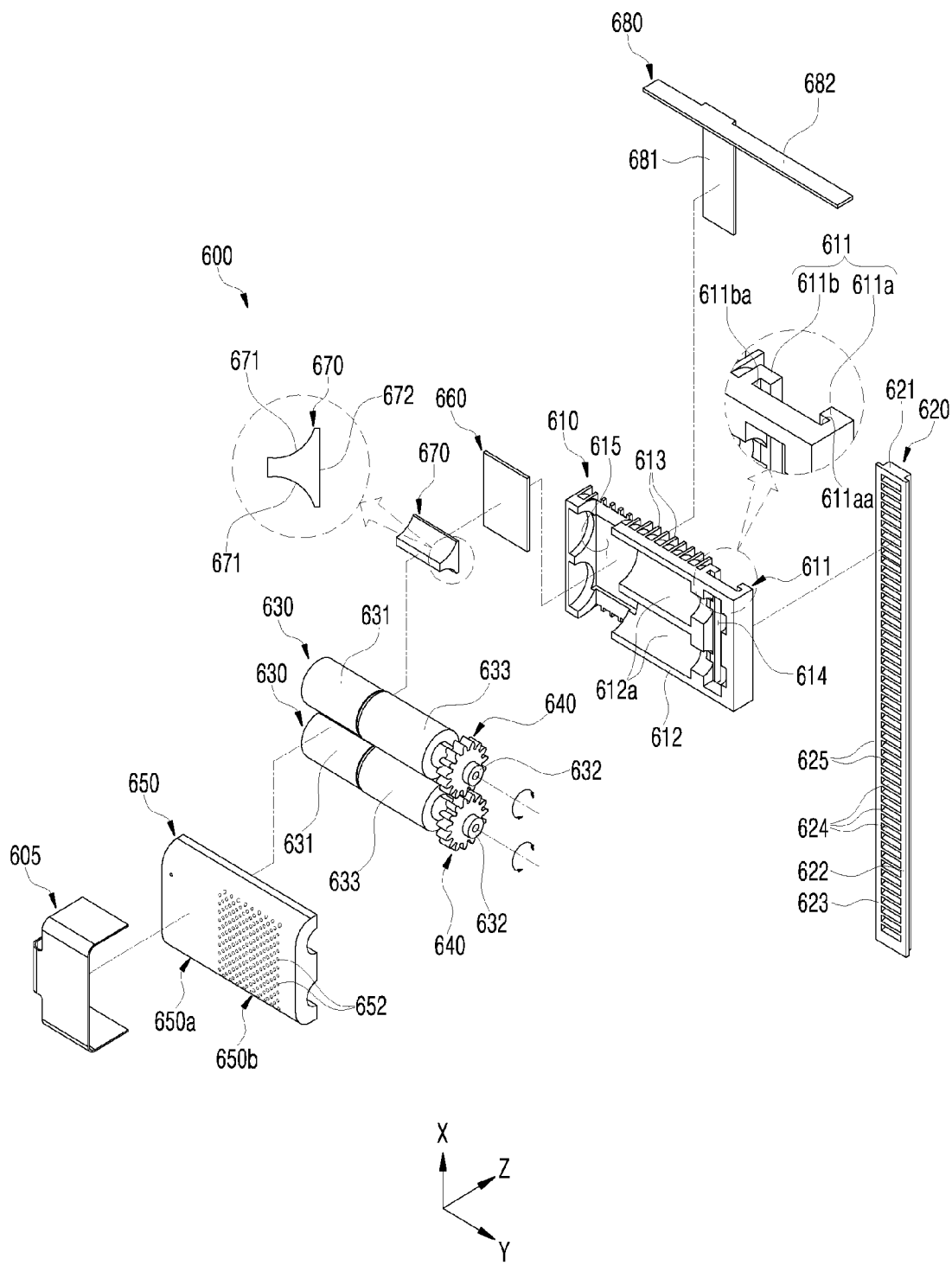
FIG. 5 is an exploded perspective view illustrating some configurations of the display device shown in FIG. 4.
Figure 6:
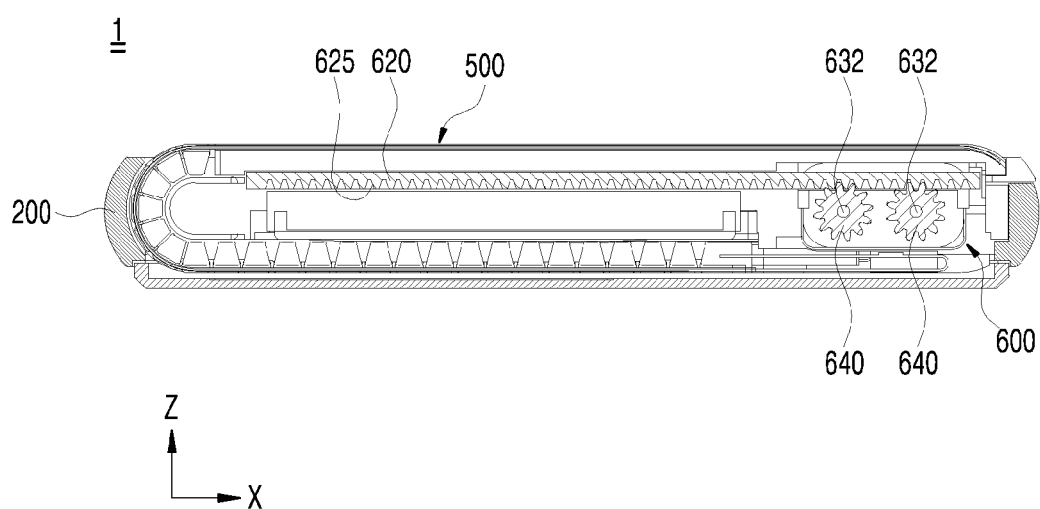
FIG. 6 is a cross-sectional view of the display device taken along line A-A' in FIG. 2A.
Figure 7:
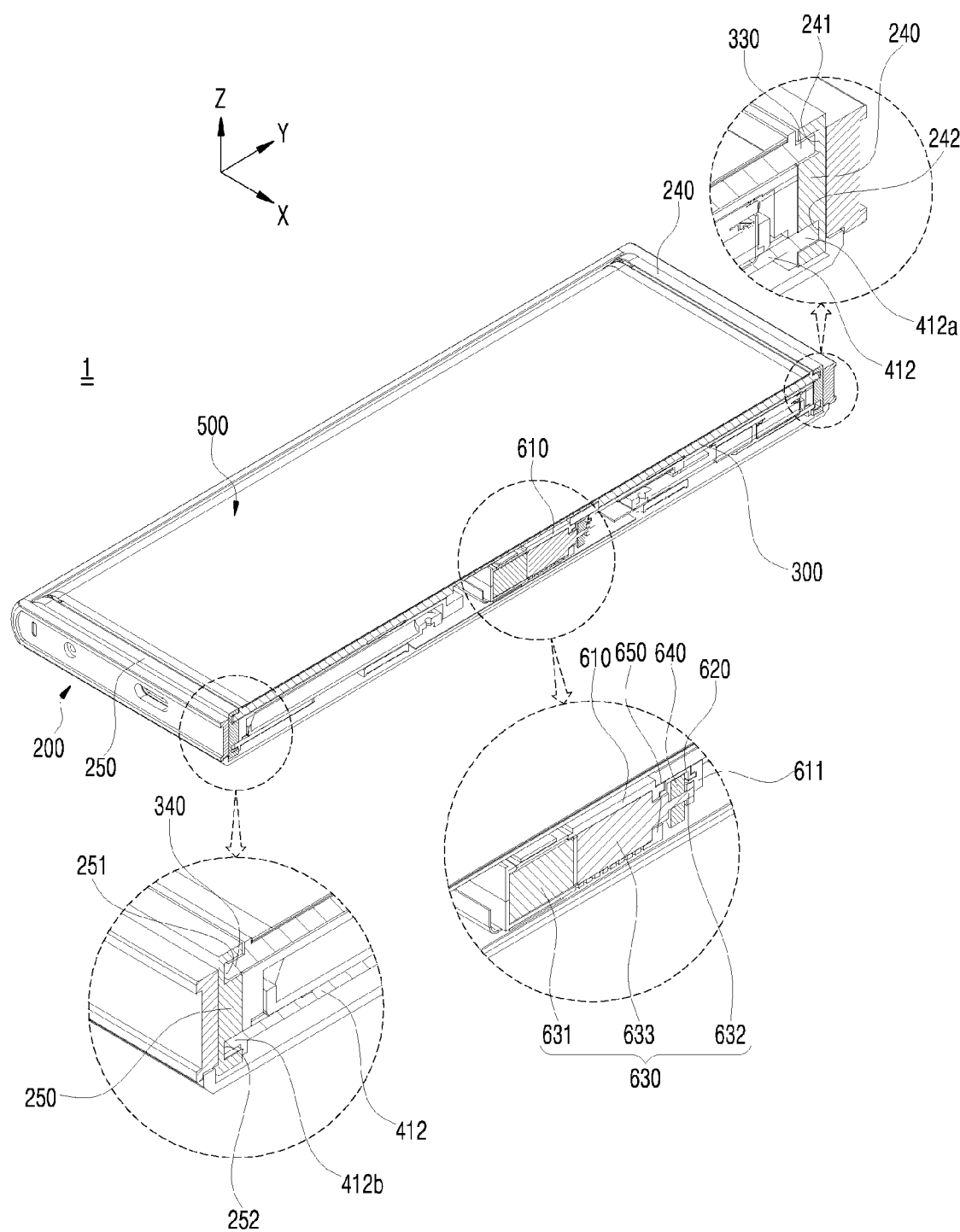
FIG. 7 is a cross-sectional perspective view of the display device taken along line B-B' in FIG. 2A.
Figure 8:
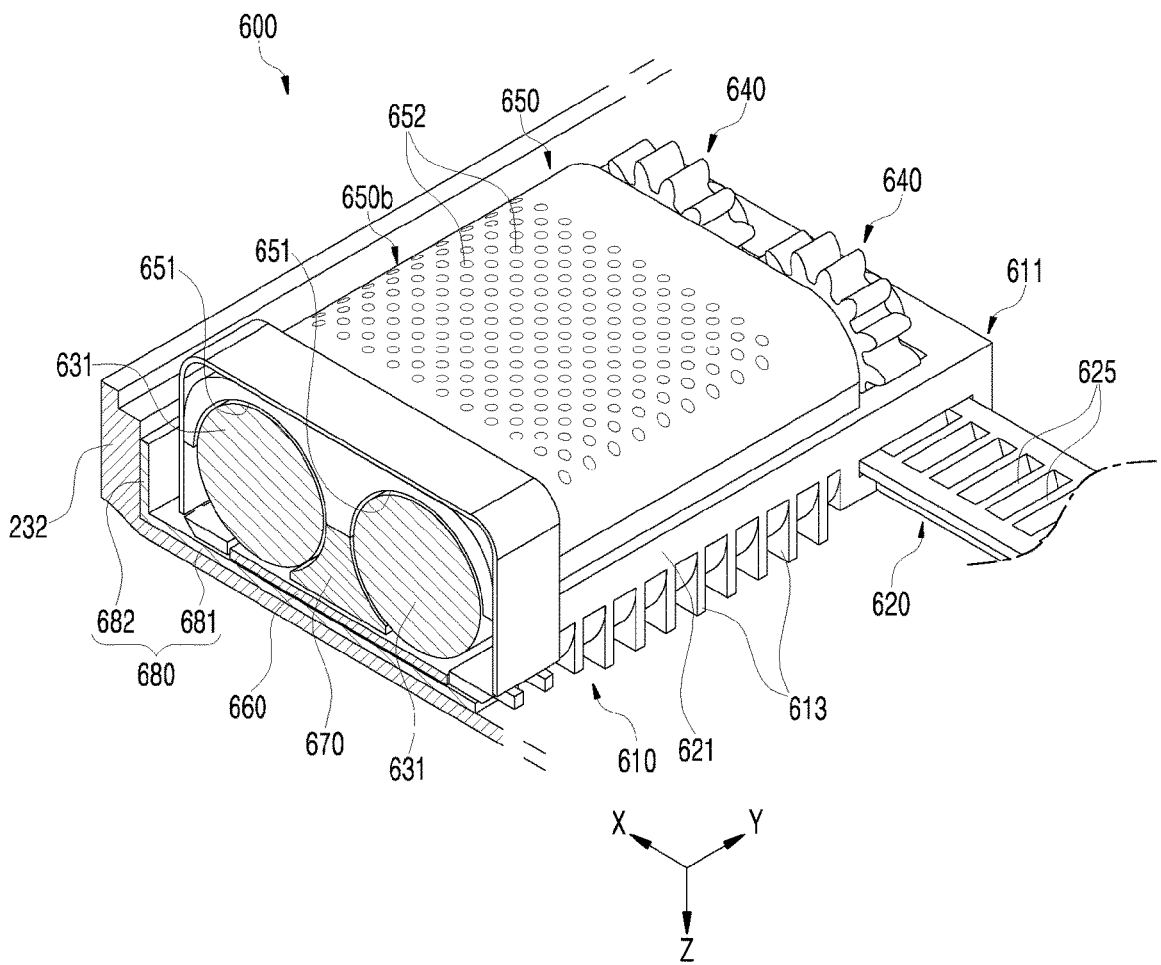
FIG. 8 is a cross-sectional perspective view illustrating a driving module coupled to the upper cover shown in FIG. 3.

FIG. 5 is an exploded perspective view illustrating some configurations of the display device 1 shown in FIG. 4, FIG. 6 is a cross-sectional view of the display device 1 taken along line A-A' in FIG. 2A, FIG. 7 is a cross-sectional perspective view of the display device 1 taken along line B-B' in FIG. 2A, and FIG. 8 is a cross-sectional perspective view illustrating a driving module 600 coupled to the upper cover 232 shown in FIG. 3.

In the display device 1 according to the embodiment of the present disclosure, the driving module 600 is configured to move the moving plate 300 relative to the body 200. In particular, the driving module 600 is configured to reciprocate the moving plate 300 relative to the body 200 in the front-rear direction.

The driving module 600 is configured to include a bracket 610, a rack 620, an actuator 630, and a driving gear 640.

In addition, the driving module 600 is configured to include a lower cover 650.

The driving module 600 or configurations thereof may be configured to be symmetrical in the front-rear direction.

In addition, the display device 1 according to the embodiment of the present disclosure may be configured to include a thermal pad 660, a heat conduction block 670, and a heat pipe 680. In addition, the display device 1 may include a flexible printed circuit board (PCB) 605 electrically connecting the actuator 630 and other components.

The actuator 630 is configured to include a driving motor 631 and a driving shaft 632. In addition, the actuator 630 is configured to include a gear box 633.

The driving motor 631 may be configured as a conventional electric motor or step motor. The driving motor 631 may be equipped with a stator and a rotor therein.

The gear box 633 is coupled to the driving motor 631 and the driving shaft 632.

The gear box 633 may transmit rotational power of the driving motor 631 to the driving shaft 632, and a plurality of gears, which rotate in conjunction with the driving motor 631 and the driving gear 640, may be provided therein. That is, the rotational power is transmitted to the rotation shaft of the driving motor 631, the gears inside the gear box 633, and the driving shaft 632 in sequence. In the actuator 630 according to the embodiment of the present disclosure may perform changing in speed by the gear box 633, and the driving motor 631 and the driving shaft 632 may be different in revolutions per unit time.

In the embodiment of the present disclosure, the gears inside the gear box 633 may be configured as reduction gears, so that the driving shaft 632 may rotate in conjunction with the driving motor 631 while the revolutions per unit time of the driving shaft 632 is less than the revolutions per unit time of the driving motor 631.

Each driving gear 640 is fixedly coupled to each driving shaft 632 to rotate along with the driving shaft 632.

The driving gear 640 may be configured in the form of a normal pinion gear to transmit rotational power of the driving motor 631 to the rack 620 such that the rack 620 linearly reciprocate back and forth.

Teeth are repeatedly formed along the outer circumferential surface of the driving gear 640, and the gear teeth of the driving gear 640 are configured to mesh with the gears 625 of the rack 620.

The driving gear 640 may be located in front of the first support 210 in the display device 1, and the driving gear 640 may be provided at a position similar to the second support 220 based on the front-rear direction. (See FIGS. 12A and 12B)

In the display device 1 according to the embodiment of the present disclosure, a pair of actuators 630 and a pair of driving gears 640 may be provided for one driving module 600.

The pair of actuators 630 are arranged in the front-rear direction, and the pair of driving shafts 632 are also arranged in the front-rear direction. In this case, each driving shaft 632 is parallel to the left-right direction.

Gears 625 may be repeatedly formed on the lower surface of the rack 620 in the longitudinal direction (movement direction) of the rack 620. That is, gears 625 may be repeatedly formed on the lower surface of the rack 620 in the front-rear direction.

The rack 620 may be made of a hard material so as to maintain its shape. The rack 620 may be made of plastic or metal. The rack 620 may be made of engineering plastic, for example, made of polyacetal, polycarbonate, polyamide, or polyphenylene oxide, made of a combination thereof, or configured to include the same. The rack 620 may be made of polyacetal to reduce friction in relation to the driving gear 640 and facilitate effective driving. Alternatively, the rack 620 may be made of stainless steel.

The rack 620 may be configured in the form of a long plate overall in the front-rear direction, and the left and right sides may be configured to be symmetrical to each other along the front-rear direction.

The rack 620 may be configured to include a first retention edge 622, a second retention edge 623, a rack body 621, and gear grooves 624.

The rack body 621 configures the center of the rack 620. The rack body 621 may have a uniform cross-section along the front-rear direction and a flat surface facing the moving plate 300, and the rack body 621 may be directly coupled to the moving plate 300.

A first retention edge 622 is provided on the left side of the rack body 621 and a second retention edge 623 is provided on the right side of the rack body 621. The first retention edge 622 and the second retention edge 623 protrude toward opposite sides.

Each of the first retention edge 622 and the second retention edge 623 of the rack 620 has a uniform cross-section along the front-rear direction.

The gear grooves 624 are configured in the form of a concave groove on the bottom surface of the rack body 621 and are repeated in the front-rear direction to form the gears 625 of the rack 620.

The rack 620 is coupled to the center of the moving plate 300 with respect to the left-right direction.

This configuration may facilitate formation of the rack 620 having precise gear grooves 624 and provide the rack 620 having excellent rigidity.

In the display device 1 according to the embodiment of the present disclosure, the gear module values of the gear of the rack 620 and the driving gear 640 may be 0.3 mm for smooth movement of the moving plate 300.

The bracket 610 is fixedly coupled to the body 200. In particular, the bracket 610 may be fixedly coupled to the center body 230.

The bracket 610 may be made of a hard material so as to maintain its shape, and may also be made of a material that effectively dissipates heat of the driving motor 631. In an embodiment of the present disclosure, the bracket 610 may be made of aluminum.

In the embodiment of the present disclosure, the bracket 610 is integrally formed. The bracket 610 may be formed to be symmetrical in the front-rear direction.

The bracket 610 may be configured to include a moving guide 611, an upper cover 612, and heat dissipation fins 613.

A recess 612a may be formed in the upper cover 612, and the recess 612a may be configured in the form of a concave groove to accommodate at least a portion of the actuator 630. The recess 612a forms a concave surface from the bottom toward the top of the upper cover 612.

The recess 612a may have a shape corresponding to the outer shape of the actuator 630, and in the case where the actuator 630 has a cylindrical shape, the recess 612a may be configured in a semi-cylindrical shape.

The heat dissipation fins 613 are formed on the outer side of the upper cover 612. The heat dissipation fins 613 may be formed on the upper surface of the upper cover 612, and may be formed to protrude upwards from the upper cover 612. A plurality of heat dissipation fins 613 may be arranged to be spaced apart from each other in the left-right direction.

A moving guide 611 is formed on the left or right side of the upper cover 612. The specific embodiment of the present disclosure shown in the drawing illustrates that the moving guide 611 is formed on the left side of the upper cover 612.

The moving guide 611 is configured to have a predetermined length in the front-rear direction. The moving guide 611 may have a uniform cross-section along the front-rear direction.

The moving guide 611 is configured to include a first guide member 611a and a second guide member 611b. The first guide member 611a and the second guide member 611b constitute a pair of guide members, and may have symmetrical shapes to each other.

The first guide member 611a and the second guide member 611b may be spaced apart from each other and have upper ends bent toward each other, which enables stable coupling between the first retention edge 622 and the second retention edge 623.

A first grip portion 611aa in the form of a concave groove is provided inside the first guide member 611a, and the first retention edge 622 is inserted into the first grip portion 611aa.

A second grip portion 611ba in the form of a concave groove is provided inside the second guide member 611b, and the second retention edge 623 is inserted into the second grip portion 611ba.

A gear accommodation space 614, which is a hole penetrating in the up-down direction, is formed between the first guide member 611a and the second guide member 611b. The driving gear 640 may be located in the gear accommodation space 614.

A pad accommodation hole 615 may be formed in the bracket 610. The pad accommodation hole 615 may be formed on the extension line of the recess 612a along the left-right direction, and is formed on the opposite side of the moving guide 611 with respect to the recess 612a. When the actuator 630 is received in the recess 612a, the pad accommodation hole 615 is located to correspond to the driving motor 631.

The pad accommodation hole 615 is configured as a hole penetrating the bracket 610 in the up-down direction.

The pad accommodation hole 615 may have a length equal to or greater than ½ of the length of the driving motor 631 in the shaft direction, and may have a width equal to or greater than the radius of the driving motor 631.

The pad accommodation hole 615 is formed in the bracket 610 such that the bracket 610 surrounds and supports the pad accommodation hole 615, thereby stably supporting the thermal pad 660 and the heat conduction block 670 placed in the pad accommodation hole 615.

The heat conduction block 670 is placed in the pad accommodation hole 615, is made of a metallic material, and enables the heat of the driving motor 631 of the actuator 630 to effectively dissipate to the outside.

The heat conduction block 670 is configured to include a heat absorption surface 671 and a heat dissipation surface 672. In addition, the heat conduction block 670 may be configured in contact with the bracket 610 while being placed in the pad accommodation hole 615.

The heat absorption surface 671 of the heat conduction block 670 is configured to come into contact with or to be close to the outer surface of the driving motor 631 and has a shape corresponding to the outer surface of the driving motor 631. That is, if the driving motor 631 has a cylindrical shape, the heat absorption surface 671 is configured to have a concave curved surface.

The heat dissipation surface 672 of the heat conduction block 670 may face the thermal pad 660 and may be flat.

In the display device according to the embodiment of the present disclosure, the heat conduction block 670 may have higher thermal conductivity than the bracket 610, and the bracket 610 may be made of a material having a lower density than the heat conduction block 670. For example, in the embodiment of the present disclosure, the bracket 610 may be made of aluminum, and the heat conduction block 670 may be made of copper.

Accordingly, heat may be rapidly transferred from the driving motor 631 to the heat conduction block 670 to be emitted to the outside, so that heat dissipation may be intensively performed in the driving motor 631. In addition, since the bracket 610 is configured to surround the heat conduction block 670, the heat transferred from the driving motor 631 to the heat conduction block 670 may be quickly transferred to the bracket 610 as well, thereby providing a display device with an excellent heat dissipation effect.

The thermal pad 660 is placed in the pad accommodation hole 615. The thermal pad 660 may be configured in the form of a flat plate, and may be configured to correspond to the size and shape of the pad accommodation hole 615.

The thermal pad 660 is made of a material having high thermal conductivity, and may be made of an existing thermal pad 660, a thermal conductive tape, or the like.

The thermal pad 660 is in contact with the heat dissipation surface 672 of the heat conduction block 670, and transfers the heat transferred from the heat conduction block 670 to the outside and the bracket 610.

The lower cover 650 is coupled to the bracket 610 to shield at least a portion of the actuator 630 while the actuator 630 is seated in the recess 612a of the bracket 610.

The lower cover 650 may be made of a hard material so as to stably maintain its shape, and may also be made of a material that effectively dissipates heat of the driving motor 631. In an embodiment of the present disclosure, the lower cover 650 may be made of aluminum.

A concave groove 651 is formed on the inner surface (upper side, the side facing the actuator 630) of the lower cover 650, and at least a portion of the actuator 630 is accommodated in the groove 651 of the lower cover 650.

The groove 651 of the lower cover 650 may be formed to have a shape corresponding to the outer shape of the actuator 630, and if the actuator 630 has a cylindrical shape, the groove 651 of the lower cover 650 may be formed in a semi-cylindrical shape.

The bracket 610 and the lower cover 650 may be coupled by fastening means such as bolts, rivets, clamps, etc., or by hooking or the like.

In the display device according to the embodiment of the present disclosure, the lower cover 650 may be configured to include a first cover area 650a and a second cover area 650b. The first cover area 650a and the second cover area 650b are portions of the lower cover 650, respectively.

The first cover area 650a shields a portion corresponding to the driving motor 631 of the actuator 630.

The second cover area 650b shields a portion corresponding to the gear box 633 of the actuator 630.

The second cover area 650b may have a plurality of heat dissipation holes 652 penetrating vertically therethrough. The heat dissipation holes 652 may be formed over a substantial area of the second cover area 650b.

All of the plurality of heat dissipation holes 652 may have the same size, shape, and spacing in the second cover area 650b, or alternatively, the heat dissipation holes 652 may be differently configured in at least one of the size, the spacing, and the number of holes per unit area depending on the distance to the first cover area 650a.

Since the heat dissipation holes 652 are formed in the second cover area 650b, the contact area with surrounding air in the second cover area 650b becomes larger than that in the first cover area 650a, heat dissipation may be effectively performed in the second cover area 650b, which enables more effective heat transfer from the first cover area 650a to the second cover area 650b.

In addition, in the case where the first cover area 650a has no heat dissipation hole 652, the first cover area 650a may be in contact with the driving motor 631 over the substantially maximum area, so that heat transfer from the driving motor 631 to the first cover area 650a is excellent, and a heat transfer path from the driving motor 631 to the first cover area 650a to the second cover area 650b may be formed to facilitate effective heat transfer.

Since the heat dissipation holes 652 may be formed on the second cover area 650b, the heat dissipation effect may be improved by circulation of air in the lower cover 650, and in the case where the sizes and spacing of the plurality of heat dissipation holes 652 are configured to be different, the direction and degree of air circulation may be varied. The size, the spacing, and the like of the heat dissipation hole 652 may be variously configured according to the structure of the actually manufactured display device.

In addition, in the display device according to the embodiment of the present disclosure, heat dissipation grease may be applied to be interposed between the actuator 630 and the bracket 610, and between the actuator 630 and the lower cover 650, so that the heat generated from the driving motor 631 may be effectively transferred to the bracket 610 and the lower cover 650.

The display device according to the embodiment of the present disclosure is configured to include a heat pipe 680.

The heat pipe 680 according to the embodiment of the present disclosure is configured as a material and structure with excellent thermal conductivity. The heat pipe 680 may be configured in the form of a relatively thin plate and have the same structure as a general heat pipe.

For example, the heat pipe 680 according to the embodiment of the present disclosure may be configured such that the heat pipe 680 made of copper is filled with a small amount of water.

The heat pipe 680 according to the embodiment of the present disclosure is configured to include a first heat transfer portion 681 and a second heat transfer portion 682.

The first heat transfer portion 681 is configured in the form of a plate such that one surface thereof is in close contact with the thermal pad 660 and the opposite surface thereof is in close contact with the body 200. The first heat transfer portion 681 may be in close contact with the upper cover 232. The first heat transfer portion 681 may be formed long in the front-rear direction and extend towards the edge of the body 200.

The second heat transfer portion 682 extends from the first heat transfer portion 681 and is configured in the form of a plate. The second heat transfer portion 682 may be configured to be bent from the first heat transfer portion 681.

The second heat transfer portion 682 is configured such that one surface thereof is spaced apart from the bracket 610 and the opposite surface thereof is in close contact with the edge of the body 200. The second heat transfer portion 682 may be in close contact with the upper cover 232.

The heat generated from the driving motor 631 may be rapidly transferred to the first heat transfer portion 681 by the heat pipe 680 and may be transferred to the second heat transfer portion 682 to be dispersed so that a heat transfer path is formed from the driving motor 631 to the heat pipe 680 and the body, facilitating effective heat dissipation.

The display device 1 according to the embodiment of the present disclosure is configured to apply uniform tension the flexible display 500 when the display device switches from a first state to a second state (when the exposed area of the flexible display 500 exposed through the top increases) and when the display device switches from the second state to the first state (when the exposed area of the flexible display 500 exposed through the top is reduced), which will be described below.

Figure 9A:
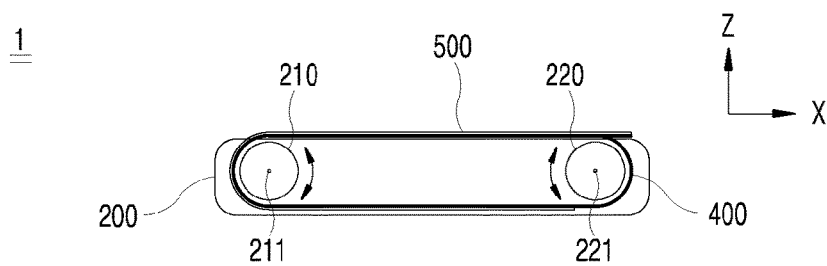
FIG. 9A is a diagram schematically and conceptually illustrating a display device according to another embodiment of the present disclosure.
Figure 9B:
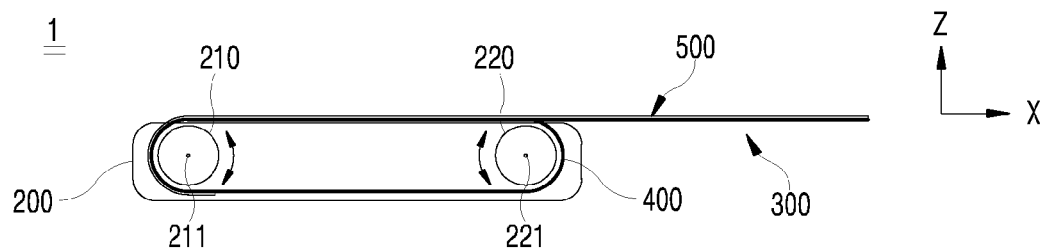
FIG. 9B is a diagram illustrating a changed state of the display device shown in FIG. 9A.

FIG. 9A is a diagram schematically and conceptually illustrating a display device 1 according to another embodiment of the present disclosure, and FIG. 9B is a diagram illustrating a changed state of the display device 1 shown in FIG. 9A.

Figure 9C:
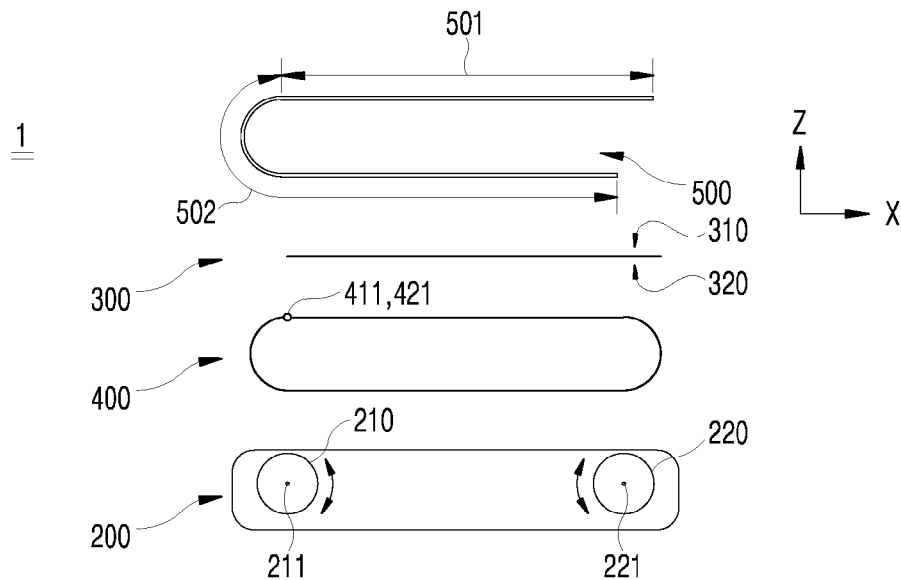
FIG. 9C is an exploded view of the configuration of the display device shown in FIG. 9A.
Figure 9D:
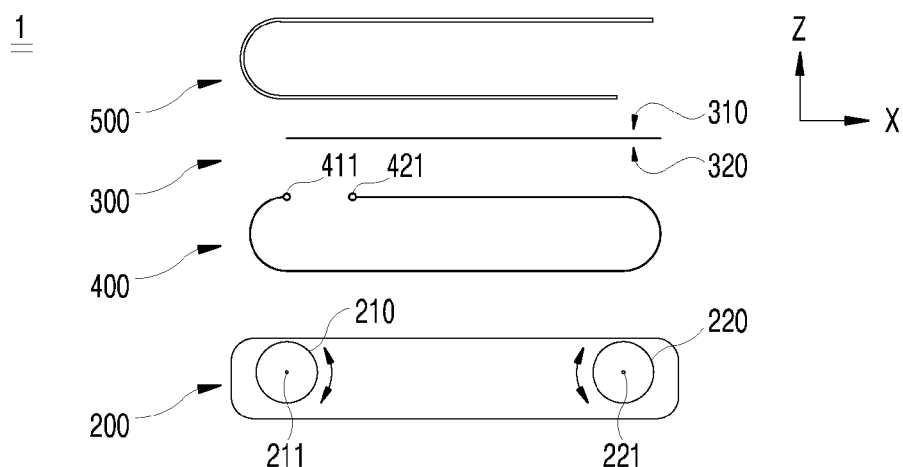
FIG. 9D is an exploded view of the configuration of a display device according to another embodiment of the present disclosure.

FIG. 9C is an exploded view of the configuration of the display device 1 shown in FIG. 9A, and FIG. 9D is an exploded view of the configuration of a display device 1 according to another embodiment of the present disclosure.

Figure 10:
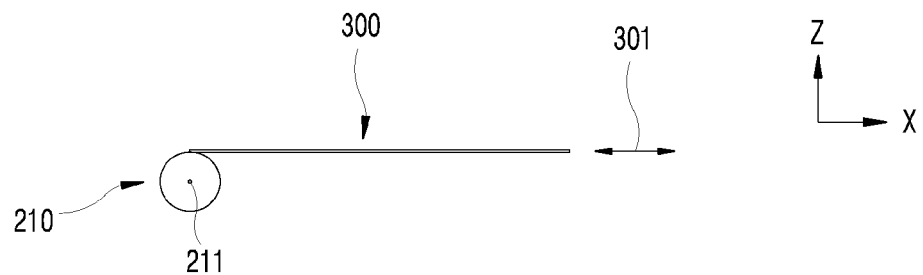
FIG. 10 is a diagram schematically and conceptually illustrating the operation of some configurations of a display device according to another embodiment of the present disclosure.

FIG. 10 is a diagram schematically and conceptually illustrating the form and operation of a moving plate 300 in a display device 1 according to another embodiment of the present disclosure.

The display device 1 according to the embodiment of the present disclosure may be configured to include a moving plate 300, a first support 210, a first shaft 211, a second support 220, a second shaft 221, and a driving track 400, as well as the body 200 and the flexible display 500.

The first shaft 211 is located below the moving plate 300, and is position at the same point as the rear end of the moving plate 300 or at the rear thereof. The first shaft 211 is configured to be parallel to the left-right direction (parallel to Y).

The first support 210 is located along the first shaft 211. The first support 210 may be divided into a plurality of pieces.

The first support 210 may be configured to not rotate. However, the rear surface of the first support 210 may be formed in a semi-circular shape. (See FIGS. 11A and 11B)

On the other hand, the first support 210 may be coupled to the body 200 to rotate clockwise and counter-clockwise (hereinafter referred to as "bidirectional rotation") about the first shaft 211. That is, the first support 210 may be coupled to the body 200 to bidirectionally rotate about the first shaft 211 parallel to the left-right direction. In this case, the first support 210 may be configured in the form of a roller or pulley.

The first support 210 may be located behind the second support 220.

The first support 210 may be formed in a cylindrical shape having the first shaft 211 as a central shaft. The driving track 400 is supported on the first support 210 so that the first support 210 rotates when the driving track 400 moves (rotates), thereby facilitating smooth movement (rotation) of the driving track 400.

The second shaft 221 is located below the moving plate 300 and in front of the first shaft 211. The second shaft 221 is configured to be parallel to the first shaft 211.

The second support is located along the second shaft. The second support may be divided into a plurality of pieces.

The second support 220 may be spaced apart from the first support 210 and may be coupled to the body 200 to bidirectionally rotate about the second shaft 221. The second support 220 may be configured in the form of a roller or pulley.

The second support 220 may be located below the moving plate 300 and in front of the first support 210, and may be coupled to the body 200 to bidirectionally rotate about the second shaft 221 parallel to the first shaft 211.

The second support 220 may be formed in a cylindrical shape having the second shaft 221 as a central shaft. The driving track 400 is supported on the second support 220 so that the second support 220 rotates when the driving track 400 moves (rotates), thereby facilitating smooth movement (rotation) of the driving track 400.

The rotation direction of the second support 220 matches the rotation direction of the first support 210.

The moving plate 300 is coupled to the body 200 to reciprocate along the moving path.

The moving plate 300 is configured in the form of a plate, and supports the bottom surface of a portion of the flexible display 500. The moving plate 300 may have a smooth upper surface 310 (outer surface) thereof.

The moving plate 300 may be formed in a planar shape. In the case where the moving plate 300 is formed in a planar shape, the moving path 301 of the moving plate 300 may be formed along an extension surface of the surface formed by the moving plate 300. In this case, the moving path 301 is configured in the form of a straight line.

If the moving plate 300 is formed in a planar shape, the moving path 301 of the moving plate 300 may be orthogonal to an arbitrary parallel line parallel to the first shaft 211.

Specifically, the moving plate 300 may be coupled to the body 200 so as to reciprocate in the front-rear direction.

The driving track 400 is disposed to surround the first support 210 and the second support 220 such that at least a portion thereof is bent. That is, the inner surface of a portion of the driving track 400 may come into close contact with the outer surface of the first support 210, and the inner surface of another portion of the driving track 400 may come into close contact with the outer surface of the second support 220.

In the display device 1 according to the embodiment of the present disclosure, the driving track 400 disposed to surround the first support 210 and the second support 220 may be configured such that a predetermined tension is applied thereto without being entirely loose, which may be adjusted depending on the overall length of the driving track 400, the distance between the first support 210 and the second support 220, whether or not a separate pulley or the like is provided, and the like.

The driving track 400 may be configured to include a first coupling portion 411 configuring one end, and a second coupling portion 421 extending from the first coupling portion 411 to configure the opposite end.

The driving track 400 may form a closed loop (circulating loop) by itself. That is, it may be configured in the form of a ring that is seamlessly continuous over the entirely thereof (See FIG. 9C) In this case, the first coupling portion 411 may be coupled to the moving plate 300, and the second coupling portion 421 may be coupled to the first coupling portion 411. As described above, the first coupling portion 411 and the second coupling portion 421 may be coupled to each other, and the driving track 400 may form continuous tracks by itself.

Alternatively, the driving track 400 may be configured in the form of a ring having discontinuity in the middle thereof (See FIG. 9D) In this case, the first coupling portion 411 may be coupled to the moving plate 300, and the second coupling portion 421 may also be coupled to the moving plate 300. That is, the first coupling portion 411 and the second coupling portion 421 may be spaced apart from each other, and the driving track 400 may be coupled to the moving plate 300, thereby forming continuous tracks together with the moving plate 300.

In describing the display device 1 according to the embodiment of the present disclosure, the longitudinal direction of the driving track 400 may be any direction orthogonal to the left-right direction (the direction parallel to the Y direction), and may be in any direction in which rotation is performed around the first shaft 211 or the second shaft 221.

In describing the display device 1 according to the embodiment of the present disclosure, the longitudinal direction of the driving track 400 may be the direction from the first coupling portion 411 to the second coupling portion 421 via the portion surrounding the first support 210 and the portion surrounding the second support 220, or may be the opposite direction thereof.

In the display device 1 according to the embodiment of the present disclosure, the flexible display 500 is integrally configured as a single display such that a portion thereof is coupled to the outer surface 310 of the moving plate 300 and such that another portion thereof is coupled to the outer surface of the driving track 400.

In a specific embodiment, it may be configured such that the middle portion of the flexible display 500 is bent, such that a portion of the flexible display 500 located on the upper side faces upwards, and such that a portion of the flexible display 500 located on the lower side faces downwards.

In the display device 1 according to the embodiment of the present disclosure, the flexible display 500 may be configured to not overlap itself, and the total length of the flexible display 500 (the length in the unfolded state) may be configured to be less than the total length of the driving track 400 (the length in the unfolded state).

In the display device 1 according to the embodiment of the present disclosure, when switching from the first state to the second state (when the exposed area to the top increases in the flexible display 500), the moving plate 300 moves forward and the driving track 400 is pulled in the clockwise direction in FIG. 9A while a constant tension is applied to the entire section of the driving track 400, so that the driving track 400 is not bent even in a portion thereof.

The flexible display 500 coupled to the outer surfaces of the moving plate 300 and driving track 400 may move together with the moving plate 300 and the driving track 400, thereby maintaining the tension applied to the flexible display 500 constant.

In the display device 1 according to the embodiment of the present disclosure, when switching from the second state to the first state (when the area exposed to the top is reduced in the flexible display 500), the moving plate 300 moves backwards and the driving track 400 is pulled while rotating in the counter-clockwise direction in FIG. 9B, thereby applying a constant tension to the entire section.

In this case, the flexible display 500 coupled to the outer surfaces of the moving plate 300 and the driving track 400 may move together with the moving plate 300 and the driving track 400, thereby maintaining the tension applied to the flexible display 500 constant.

Figure 11A:
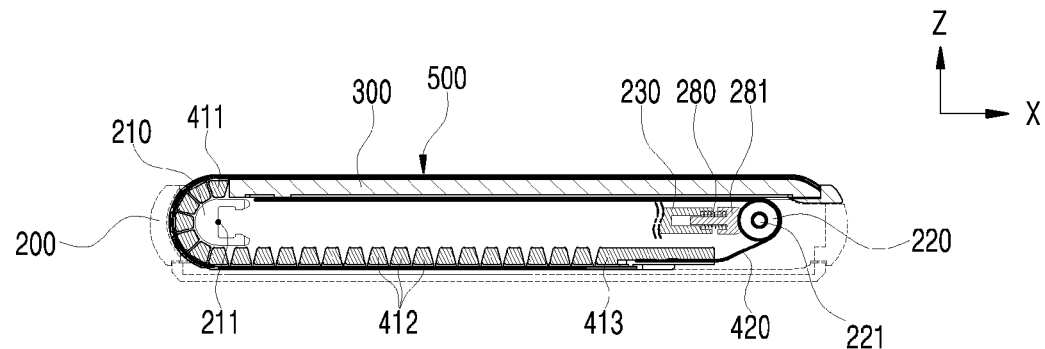
FIG. 11A is a cross-sectional view of the display device taken along line C-C' in FIG. 2A.
Figure 11B:
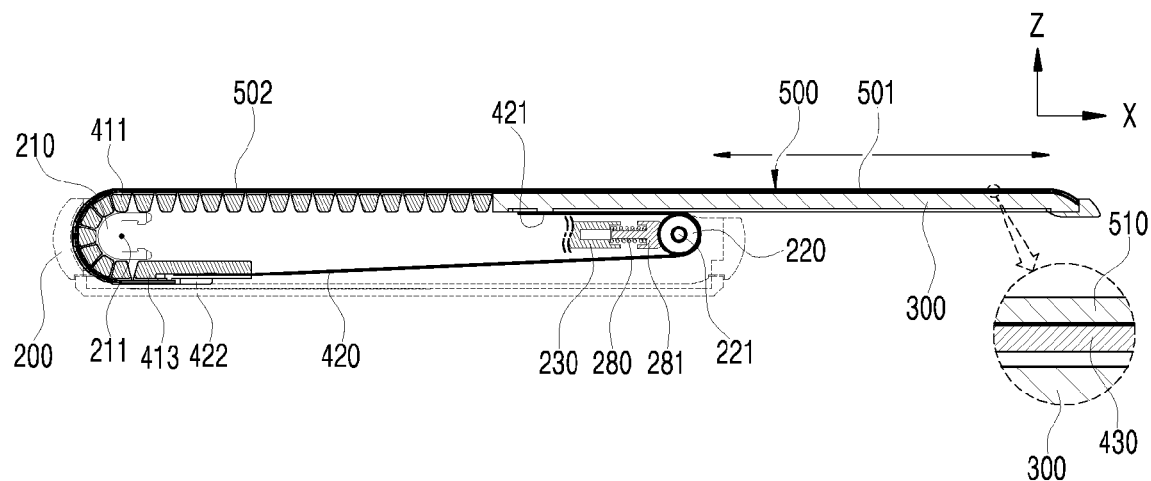
FIG. 11B is a cross-sectional view illustrating a changed state of the display device shown in FIG. 11A.
Figure 11C:
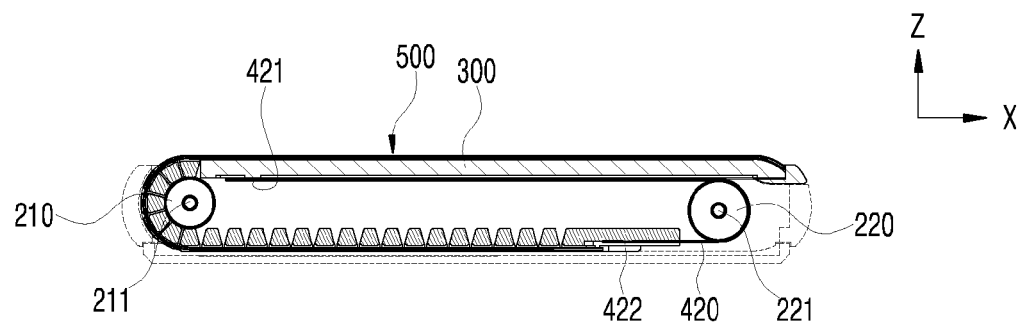
FIG. 11C is a cross-sectional view illustrating a display device according to another embodiment of the present disclosure.
Figure 11D:
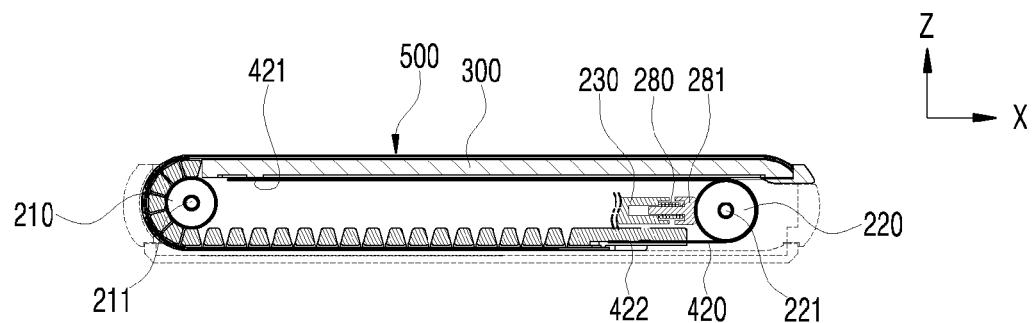
FIG. 11D is a cross-sectional view illustrating a display device according to another embodiment of the present disclosure.

FIG. 11A is a cross-sectional view of the display device 1 taken along line C-C' in FIG. 2A, FIG. 11B is a cross-sectional view illustrating a changed state of the display device 1 shown in FIG. 11A, FIG. 11C is a cross-sectional view illustrating a display device 1 according to another embodiment of the present disclosure, and FIG. 11D is a cross-sectional view illustrating a display device 1 according to another embodiment of the present disclosure.

Figure 12A:
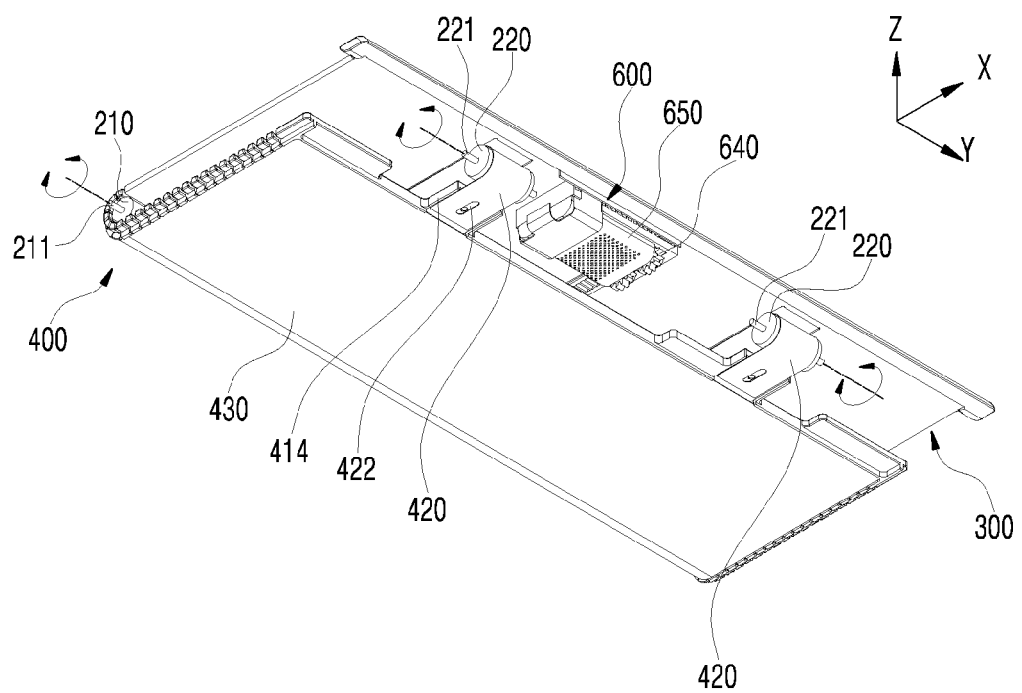
FIGS. 12A and 12B are bottom perspective views illustrating the operation of some configurations of a display device according to another embodiment of the present disclosure.
Figure 12B:
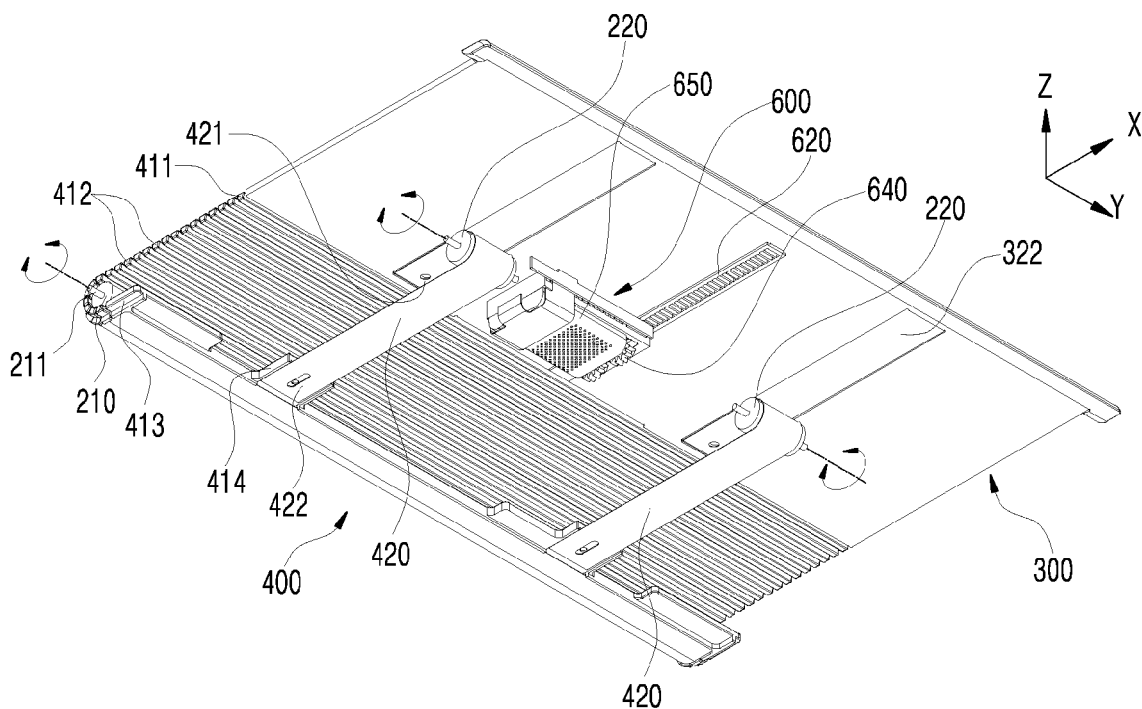

FIGS. 12A and 12B are bottom perspective views illustrating the operation of some configurations of a display device 1 according to another embodiment of the present disclosure. Specifically, some configurations of the driving track 400 and the driving module 600 coupled to the moving plate 300 are illustrated in FIGS. 12A and 12B.

FIGS. 11A and 12A correspond to a first state, respectively, and FIGS. 11B and 12B correspond to a second state, respectively.

The driving track 400 may be configured to include a back plate 430, hinge segments 411, 412, and 413, and a guide plate 420.

The back plate 430 may have a size corresponding to the entire inner surface of the flexible display 500 and may also be coupled to the entire inner surface of the flexible display 500. (See FIG. 4)

The hinge segments 411, 412, and 413 may be configured to be long along the left-right direction, and a plurality of hinge segments may be provided to be consecutively arranged on and coupled to the inner surface of the back plate 430.

The back plate 430 and the respective hinge segments 411, 412, and 413 may be coupled by various methods such as bonding, welding, or the like.

The guide plate 420 may be made of an elastic metal plate having in at least a portion thereof, and one end 422 thereof may be connected to the third hinge segment 413, and the opposite end 421 thereof may be connected to the moving plate 300.

In the display device 1 according to the embodiment of the present disclosure, a pair of guide plates 420 may be provided, and the pair of guide plates 420 may be symmetrically provided in the left-right direction on the bottom surface of the moving plate 300 and may be symmetrical in the left-right direction with respect to the rack 620.

In describing the display device 1 according to the embodiment of the present disclosure, the longitudinal direction of the flexible display 500 may be any direction orthogonal to the left-right direction (a direction parallel to the Y direction), and may be any direction in which rotation is performed around the first shaft 211.

In the display device 1 according to the embodiment of the present disclosure, the flexible display 500 may be configured to include a basic exposure area 501 and an additional exposure area 502. (See FIGS. 2B, 9C, and 11B)

The basic exposure area 501 may be an area exposed while overlapping the outer surface 310 of the moving plate 300, and the basic exposure area 501 may be the area of the flexible display 500 exposed when viewed from above in the first state.

The additional exposure area 502 may be an area, other than the basic exposure area 501, exposed while overlapping the outer surface of the driving track 400, and the additional exposure area 502 may be the area of the flexible display 500 exposed when viewed from above in the second state, excluding the basic exposure area 501.

In the display device 1 according to the embodiment of the present disclosure, the additional exposure area 502, exposed to the same side as the basic exposure area 501, is configured to change in the size thereof according to movement of the moving plate 300.

The hinge segments 411, 412, and 413 may be made of a hard material so as to maintain their shapes. The hinge segments 411, 412, and 413 may be made of metal or plastic, or may be configured to include the same.

Among the hinge segments, the first hinge segment 411 configuring one end in the longitudinal direction may be located close to the rear end of the moving plate 300, and the third hinge segment 413 configuring the opposite end may be coupled to the guide plate 420, and a plurality of second hinge segments 412 consecutively arranged in the longitudinal direction, excluding the portion 411 close to the rear end of the moving plate 300 and the portion 413 coupled to the guide plate 420, may be configured to be the same as each other. In addition, each second hinge segment 412 may have a uniform cross-section along the left-right direction. The cross-section of each second hinge segment 412 may have a trapezoidal shape in which the outer width is greater than the inner width.

The hinge segments 411, 412, and 413 may have a constant thickness (width in the up-down direction when the hinge segments are placed in the front-rear direction), and the thickness of each hinge segment 411, 412, or 413 may be configured to be the same as or similar to the thickness (width in the up-down direction) of the moving plate 300.

Among the hinge segments 411, 412, and 413, the first hinge segment 411 connected to the rear end of the moving plate 300 may be the above-described first coupling portion 411. The first hinge segment 411 may be rotatably connected to the second hinge segment 412 immediately adjacent thereto, and the first hinge segment 411 may be rotatably connected to the moving plate 300. In this case, the thickness of the first hinge segment 411 may be the same as or similar to the thickness of the moving plate 300.

When the first hinge segment 411 is rotatably connected to the moving plate 300, the rotation shaft thereof is parallel to the first shaft 211, and when the first hinge segment 411 is rotatably coupled to the adjacent second hinge segment 412, the rotation shaft thereof is parallel to the first shaft 211. The respective second hinge segments 412 are rotatably connected to each other, and their rotation shafts are parallel to the first shaft 211.

The first hinge segment 411 constituting the first coupling portion 411 is configured to reciprocate in the front-rear direction in the body 200, and the first hinge segment 411 is located above the line segment connecting the first shaft 211 and the second shaft 221.

The second hinge segments 412 are bent to each other at the positions where they are supported by the first support 210, and may be unfolded to be flat at other positions.

The third hinge segment 413 coupled to the guide plate 420, among the hinge segments, may be rotatably connected to the second hinge segment 412 immediately adjacent thereto.

The third hinge segment 413 may be coupled to the guide plate 420 in the first middle coupling portion 414.

The third hinge segment 413 is configured to reciprocate in the front-rear directions in the body 200, and the third hinge segment 413 is located below the line segment connecting the first shaft 211 and the second shaft 221.

In the display device 1 according to the embodiment of the present disclosure, the first support 210 and the second support 220 may be configured to move relative to each other in directions away from each other.

In addition, the display device 1 may be configured to further include an elastic body 280 for elastically supporting any one of the first support 210 and the second support 220 in a direction away from the other. (See FIGS. 11A, 11B, and 11D)

In the specific embodiment of the present disclosure, the first support 210 may be configured such that the shaft (first shaft 211) thereof is located at a fixed point based on the body 200, and the second support 220 may be configured such that the shaft (second shaft 221) thereof may reciprocate in the front-rear direction based on the body 200. In this case, the elastic body 280 may be configured to press the second support 220 such that the second support 220 moves away from the first support 210.

The elastic body 280 may be configured in the form of a conventional coil spring. The elastic body 280 may be configured to store elastic force in a compression-deformed state and press the first support 210 in this state.

In the embodiment of the present disclosure, the elastic body 280 may be configured to directly press the second support 220, or may be configured to press the first support 210 using a separate pusher 281 as a medium.

This configuration may apply a constant tension to the driving track 400 over the entire section without loosening, and may apply a constant tension to the flexible display 500 as well.

The elastic body 280 and the pusher 281 may be operated while being supported inside the body 200, and, for example, may be operated while being supported by the center body 230 described in the embodiment of the present disclosure.

Figure 13:
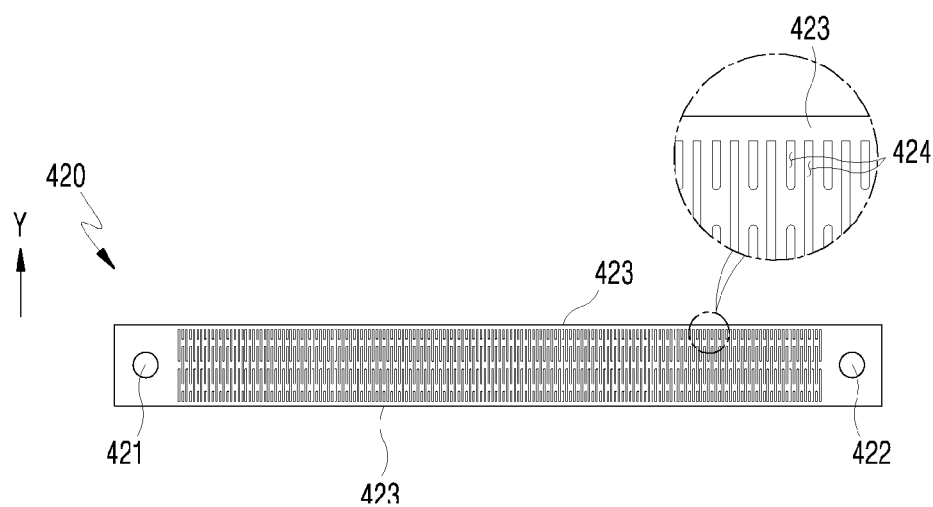
FIG. 13 illustrates a plan view of a guide plate according to the embodiment of the present disclosure, which further illustrates an enlarged view of the pattern of the guide plate.

FIG. 13 illustrates a plan view of a guide plate 420 according to the embodiment of the present disclosure, which further illustrates an enlarged view of the pattern of the guide plate 420.

In the display device 1 according to the embodiment of the present disclosure, a plurality of guide plates 420 may be provided.

At least a portion of the guide plate 420 may be formed of an elastic metal plate. The guide plate 420 may be made of a superelastic metal.

The guide plate 420 may be made of a superelastic wire, a Flexinol wire, a shape memory alloy wire, etc., or may be configured to include the same.

The guide plate 420 may be configured in the form of a relatively thin plate. The guide plate 420 may be configured to have an arbitrary thickness in the range of 0.05 to 0.2 mm, and may be configured to have a thickness of 0.1 mm.

Two or more guide plates 420 may be provided in one driving track 400.

The guide plate 420 has one end coupled to the third hinge segment 413 and the opposite end configuring a second coupling portion 421.

A portion of the guide plate 420, which is connected to the first middle coupling portion 414 of the third hinge segment 413, configures a second middle coupling portion 422. The first middle coupling portion 414 of the third hinge segment 413 and the second middle coupling portion 422 may be coupled by fastening means such as bolts, or may be coupled to each other by hooking, bonding, welding, or the like.

The second coupling portion 421 of the guide plate 420 may be coupled to the first coupling portion 411, or may be coupled to the moving plate 300.

In the case where the second coupling portion 421 is coupled to the moving plate 300, the second coupling portion 421 may be closely coupled to one point 322a of the bottom surface of the moving plate 300. The second coupling portion 421 and the moving plate 300 may be coupled by fastening means such as bolts, or may be coupled by hooking, bonding, welding, or the like.

When the second coupling portion 421 is coupled to the moving plate 300, the second coupling portion 421 is coupled to a point 322a close to the rear end of the moving plate 300. That is, the second coupling portion 421 is coupled to the moving plate 300 at the point 322a located closer to the rear from the center between the front end and the rear end of the moving plate 300.

The guide plate 420 may be configured to include support portions 423 and a first through-hole 424.

The support portions 423 configure both edges of the guide plate 420 in the longitudinal direction thereof. The support portion 423 may be formed overall in a straight line.

The first through-hole 424 is a hole penetrating in the thickness direction between the support portions 423, and is formed long in the width direction. The first through-holes 424 may be repeatedly formed along the longitudinal direction of the guide plate 420, or may be repeatedly formed along the width direction of the guide plate 420.

Since the first through-holes 424 long in the width direction are repeatedly formed in the guide plate 420, the guide plate 420 may be easily bent around the rotation shaft in the width direction.

Since the guide plate 420 is provided with the support portions 423 and the first through-holes 424, when the guide plate 420 is bent around the second shaft 221 of the second support 220, it is possible to facilitate elastic deformation of the guide plate 420 and provide the plate 420 capable of easily controlling springback.

Figure 14:
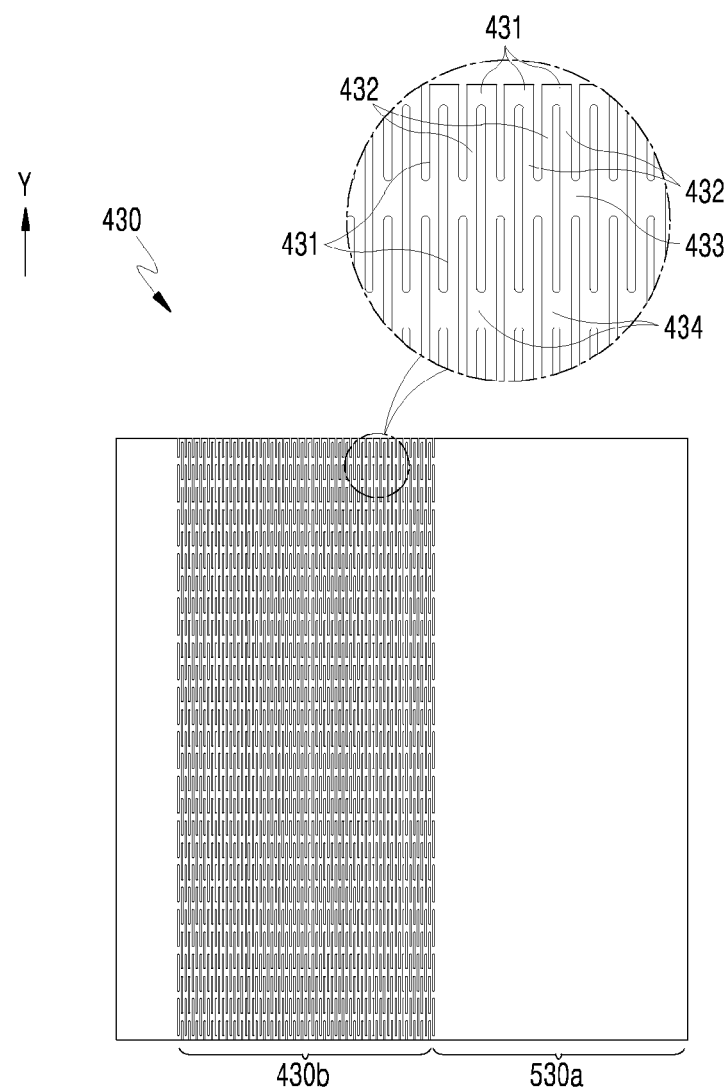
FIG. 14 illustrates a plan view of a back plate according to the embodiment of the present disclosure, which further illustrates an enlarged view of the pattern of the back plate.

FIG. 14 illustrates a plan view of a back plate 430 according to the embodiment of the present disclosure, which further illustrates an enlarged view of the pattern of the back plate 430.

In the display device 1 according to the embodiment of the present disclosure, the flexible display 500 may be configured by stacking a plurality of layers, a display layer 510 on which an image is displayed may be formed on the outer side, and the back plate 430 may be coupled to the lower side of the display.

The back plate 430 may be formed of an elastic metal plate. The back plate 430 may be configured to include a superelastic metal.

The back plate 430 facilitates elastic deformation and elastic recovery of the flexible display 500.

The back plate 430 may be configured in the form of a relatively thin plate. The back plate 430 may be configured to have an arbitrary thickness in the range of 0.05 to 0.2 mm, and may be configured to have a thickness of 0.1 mm.

In the display device 1 according to the embodiment of the present disclosure, the back plate 430 may be made of an integral metal plate overall and may be divided into two or more areas.

Specifically, the back plate 430 may be configured to include a fixed area 430a and a deformable area 430b.

The fixed area 430a is an area overlapping the outer surface 310 of the moving plate 300. In the fixed area 430a, the moving plate 300 may be configured in the form of a flat metal plate overall.

In the fixed area 430a, the back plate 430 may be symmetrical in the left-right direction.

The deformable area 430b is an area overlapping the outer surfaces of the hinge segments of the driving track 400. In the deformable area 430b, second through-holes 435, which are a plurality of through-holes, are formed to be long in the width direction thereof (in the left-right direction). That is, in the deformable area 430b, a plurality of through-holes 435 is formed on the moving plate 300 to penetrate therethrough in the thickness direction.

In the deformable area 430b, the back plate 430 may be formed to be symmetrical in the left-right direction.

The deformable area 430b in which the plurality of second through-holes 435 is formed may be configured to include an edge portion 431, a horizontal-connection portion 432, and a first vertical-connection portion 433.

The edge portions 431 are divided into a plurality of portions to configure the left and right edges of the back plate 430. The edge portions 431 have a predetermined length along the longitudinal direction, and the respective edge portions 431 are spaced apart from each other.

The horizontal-connection portion 432 extends from the edge portion 431 in the width direction, and two horizontal-connection portions 432 extend from one edge portion 431.

The first vertical-connection portion 433 connects two horizontal-connection portions 432 extending from different edge portions 431 to each other. That is, the first vertical-connection portion 433 connects two adjacent horizontal-connection portions 432 to each other, which extend from two adjacent edge portions 431. The first vertical-connection portions 433 may be repeatedly formed along the width direction (left-right direction), and the respective first vertical-connection portions 433 may be spaced the same distance apart from each other.

A second vertical-connection portion 434 may be formed in the deformable area 430b, and the second vertical-connection portion 434 connects two horizontal-connection parts 432 extending from the same edge portion 431 to each other. The second vertical-connection portions 434 may be repeatedly formed along the width direction (left-right direction), and the respective second vertical-connection portions 434 may be spaced the same distance apart from each other.

As described above, since the second through-holes 435 long in the width direction are repeatedly formed in the deformable area 430b, the deformable area 430b may be easily bent around the rotation shaft in the width direction.

In addition, when a tensile force, which is an external force, is applied to the deformable area 430b in the longitudinal direction, the edge portion 431 and the first vertical-connection portion 433 may be deformed in directions away from each other in the longitudinal direction based on the horizontal-connection portion 432, and the length of the entire area of the deformable area 430b may be increased. When the external force is removed, the deformable area 430b may be restored to its original state while being elastically restored.

In addition, when a tensile force, which is an external force, is applied to the deformable area 430b in the longitudinal direction, the first vertical-connection portion 433 and the second vertical-connection portion 434 may be deformed in directions away from each other in the longitudinal direction based on the horizontal-connection portion 432, and the length of the entire area of the deformable area 430b may be increased. When the external force is removed, the deformable area 430b may be restored to its original state while being elastically restored.

Since the deformable area 430b is provided in the back plate 430, the area overlapping the outer surfaces of the hinge segments 411, 412, and 413 of the driving track 400 may be deformed more flexibly. In addition, when the flexible display 500 is bent around the first shaft 211 of the first support 210, elastic deformation of the flexible display 500 is easy and the flexible display 500 capable of easily controlling springback may be provided.

In addition, since the deformable area 430b is provided in the back plate 430, the flexible display 500 may be elastically deformed within a predetermined range in the longitudinal direction.

Figure 15A:
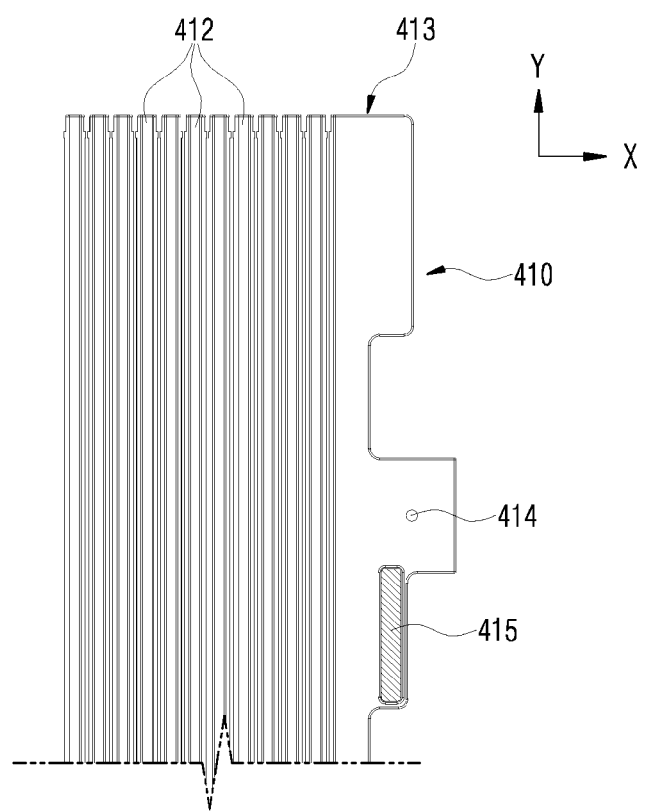
FIG. 15A is a plan view illustrating some of hinge segments according to the embodiment of the present disclosure.
Figure 15B:
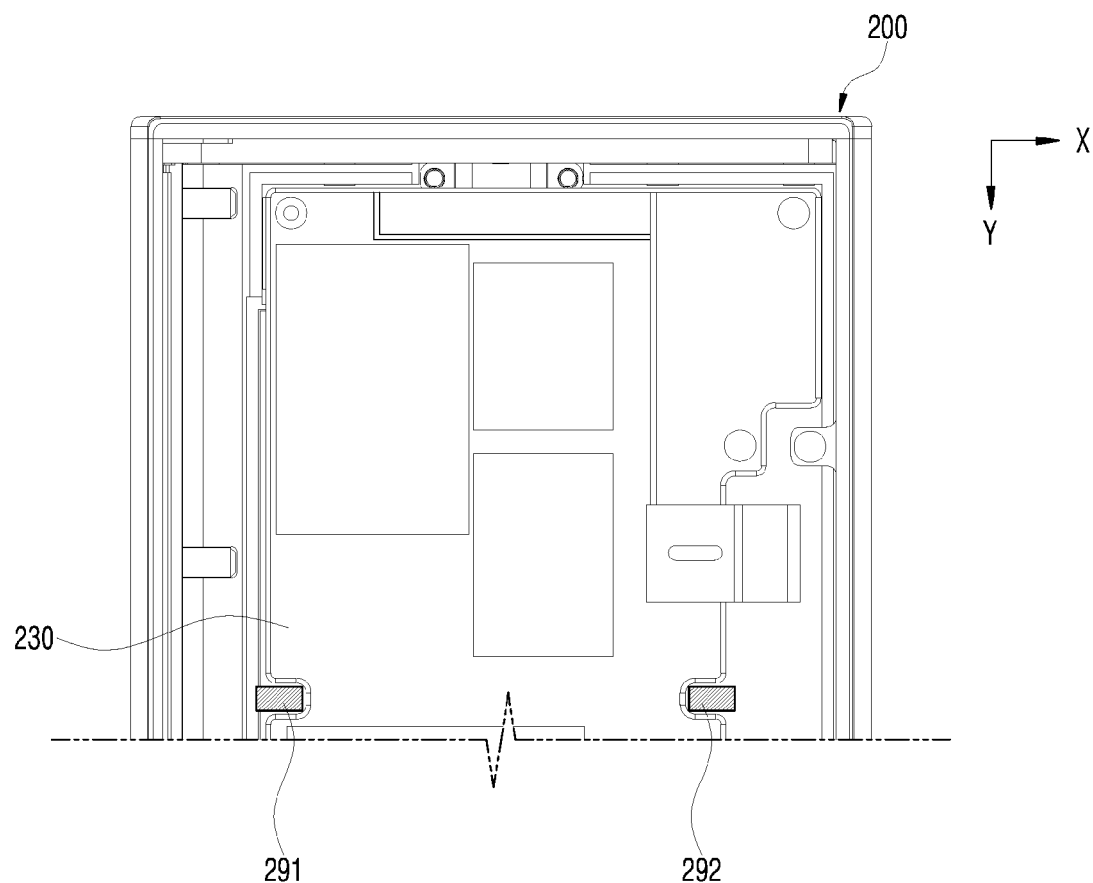
FIG. 15B is a bottom view illustrating a portion of a body according to the embodiment of the present disclosure.
Figure 16A:
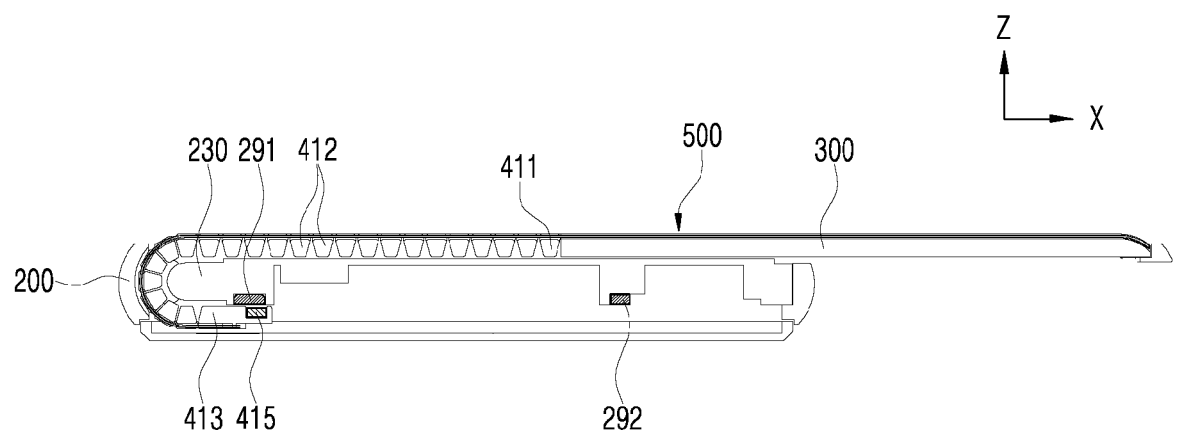
FIGS. 16A and 16B are cross-sectional views illustrating the operation of a display device according to another embodiment of the present disclosure.
Figure 16B:
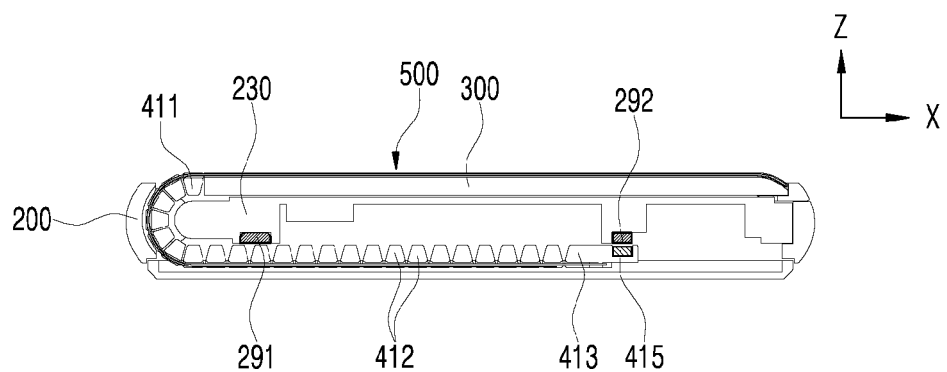

FIG. 15A is a plan view illustrating some of hinge segments 412 and 413 according to the embodiment of the present disclosure, FIG. 15B is a bottom view illustrating a portion of a body 200 according to the embodiment of the present disclosure, and FIGS. 16A and 16B are cross-sectional views illustrating the operation of a display device 1 according to another embodiment of the present disclosure.

In the display device 1 according to the embodiment of the present disclosure, the driving track 400 may be configured to include a magnet 415, and the body 200 may be configured to include a first Hall sensor 291 and a second Hall sensor 292. The first Hall sensor 291 and the second Hall sensor 292 may be provided on the center body 230.

The magnet 415 may be configured as a conventional permanent magnet or electromagnet.

The first Hall sensor 291 and the second Hall sensor 292 may be configured as conventional Hall sensors, and detect a change in the magnetic field when the magnet 415 approaches or moves away, thereby detecting movement of the driving track 400.

In the embodiment of the present disclosure, the first Hall sensor 291 may be configured to detect an approach of the magnet 415 when the moving plate 300 moves forward.

In addition, the second Hall sensor 292 may be configured to detect an approach of the magnet 415 when the moving plate 300 moves backwards.

In the display device 1 according to the embodiment of the present disclosure, the rotation speed of the driving motor 631 may be controlled according to signals detected by the first Hall sensor 291 and the second Hall sensor 292.

For example, while switching from the first state to the second state, the rotation speed of the driving motor 631 may be reduced when the magnet 415 approaches the first Hall sensor 291, and the rotation of the driving motor 631 may be stopped when the magnet gets closest to the first Hall sensor 291.

In addition, while switching from the second state to the first state, the rotation speed of the driving motor 631 may be reduced when the magnet 415 approaches the second Hall sensor 292, and the rotation of the driving motor 631 may be stopped when the magnet 415 gets closest to the second Hall sensor 292.

Accordingly, the range in which the screen of the flexible display 500 is extendable may be effectively limited.

In addition, the speed of the driving motor 631 may be differently controlled depending on the time at which the screen of the flexible display 500 starts to expand and the time at which the expansion is completed, or the time at which the screen of the flexible display 500 starts to be reduced and the time at which reduction is completed, thereby providing the display device 1 that is smoothly and quickly operated.

Although specific embodiments of present disclosure have been described and illustrated above, present disclosure is not limited to the described embodiments, and it will be understood by those of ordinary skill in the art that there may be various modifications and variations into other specific embodiments without departing from the spirit and scope of present disclosure. Therefore, the scope of the present disclosure should be determined by the technical idea described in the claims, instead of by the described embodiment.

INDUSTRIAL APPLICABILITY

A display device according to the embodiment of the present disclosure has remarkable industrial applicability as to providing a display device capable of minimizing the thickness and size of a driving module while enabling stable reciprocation of a moving plate relative to a body and effective heat dissipation of an actuator.

What is claimed is:

1. A display device comprising a body, a moving plate reciprocates relative to the body in a front-rear direction, and a display coupled to an outer surface of the moving plate, the display device further comprising:
   a bracket made of a metallic material and coupled to the body, the bracket comprising a moving guide formed in the front-rear direction, an upper cover extending from the left or right side of the moving guide in a left-right direction to form a concave recess, and a plurality of heat dissipation fins integrally formed on the outer side of the upper cover;
   a rack coupled to the moving guide to slide in the front-rear direction, having gears repeatedly formed along the front-rear direction, and coupled to the moving plate;
   an actuator seated in the recess and comprising a driving motor and a driving shaft rotated by the driving motor; and
   a driving gear coupled to the driving shaft and meshed with the gears of the rack.

2. The display device of claim 1, wherein the actuator comprises a gear box provided between the driving motor and the driving shaft to transmit power, and
   wherein the bracket comprises a pad accommodation hole formed as a hole penetrating the bracket on an extension line of the recess at a position corresponding to the driving motor, and having a length equal to or more than ½ of a length of the driving motor in a shaft direction and a width equal to or greater than a radius of the driving motor,
   the display device comprising:
   a thermal pad placed in the pad accommodation hole; and
   a heat conduction block made of a metallic material and provided with a heat dissipation surface in close contact with the thermal pad and a heat absorption surface in close contact with or close to the driving motor.

3. The display device of claim 2, wherein the heat conduction block has higher thermal conductivity than the bracket, and
   wherein the bracket has a lower density than the heat conduction block.

4. The display displayed of claim 2, comprising a heat pipe comprising a first heat transfer portion configured in the form of a plate having one surface in close contact with the thermal pad and the opposite surface in close contact with the body and extending toward the edge of the body, and a second heat transfer portion extending from the first heat transfer portion and configured in the form of a plate having one surface spaced apart from the bracket and the opposite surface in close contact with the edge of the body.

5. The display device of claim 1, comprising a lower cover made of a metallic material and coupled to the bracket to shield and support at least a portion of the actuator seated in the recess,
   wherein the bracket, the rack, the actuator, the driving gear, and the lower cover are combined to configure a driving module.

6. The display device of claim 5, wherein heat dissipation grease is applied to be interposed between the actuator and the bracket, and between the actuator and the lower cover.

7. The display device of claim 1, wherein the actuator comprises a gear box provided between the driving motor and the driving shaft to transmit power,
   wherein the display device comprises a lower cover made of a metallic material and coupled to the bracket to shield and support at least a portion of the actuator seated in the recess, and
   wherein the lower cover comprises a first cover area configured to shield a side corresponding to the driving motor, and a second cover area configured to shield a side corresponding to the gear box and having a plurality of heat dissipation holes formed to penetrate therethrough.

8. The display device of claim 7, wherein the heat dissipation holes are configured to be different in at least one of a size, spacing, and the number of holes per unit area depending on a distance to the first cover area.

9. The display device of claim 1, wherein a pair of actuators and a pair of driving gears are provided to be arranged in the front-rear direction.

10. The display device of claim 9, wherein the bracket comprises:
    a first guide member and a second guide member provided as a pair to be spaced apart from each other and having ends thereof bent toward each other to configure the moving guide; and
    a gear accommodation space, as a through-hole between the first guide member and the second guide member, in which the driving gear is located, and
    wherein the rack comprises:
    a first retention edge and a second retention edge respectively caught on the first guide member and the second guide member;
    a rack body protruding toward the moving plate between the first retention edge and the second retention edge; and
    gear grooves, which are a plurality of grooves formed between the first retention edge and the second retention edge, configuring gears of the rack.

11. The display device of claim 1, wherein the body comprises:
    a first holder having a first rail formed parallel to the front-rear direction;
    a second holder spaced apart from the first holder and having a second rail parallel to the first rail; and
    a center body connecting the first holder and the second holder, and
    wherein, a first slider moving along the first rail is formed on one side of the moving plate and a second slider moving along the second rail is formed on the opposite side thereof.

12. The display device of claim 1, wherein the display is a flexible display, and
    wherein the display device comprises:
    a first shaft parallel to the left-right direction, located below the moving plate, and located at the same point as the rear end of the moving plate or at the rear thereof;
    a first support located along the first shaft;
    a second shaft located below the moving plate and located in front of the first shaft to be parallel to the first shaft;
    a second support located along the second shaft; and a driving track configured to be bent in at least a portion thereof, disposed to surround the first support and the second support to come into close contact therewith to form a closed loop, and coupled to the moving plate to reciprocate based on the first shaft and the second shaft.

13. The display device of claim 12, wherein a portion of the display is coupled to the outer surface of the driving track and a portion thereof is located below the first support and the second support when the driving track reciprocates.

14. The display device of claim 12, wherein the display comprises:
   a basic exposure area exposed while overlapping the outer surface of the moving plate; and
   an additional exposure area exposed while overlapping the outer surface of the driving track, excluding the basic exposure area,
   wherein the size of the additional exposure area exposed to the same side as the basic exposure area changes according to the movement of the moving plate.

15. The display device of claim 12, wherein the driving track comprises:

a back plate made of an elastic metal plate and coupled to the inner surface of the flexible display;
   a plurality of hinge segments extending in the left-right direction and coupled to the inner surface of the back plate to be consecutively arranged thereon; and
   a guide plate made of an elastic metal plate in at least a portion thereof and having one end connected to the hinge segment and the opposite end coupled to the moving plate.

16. The display device of claim 12, wherein the first support and the second support have curved surfaces in contact with the driving track, and
   wherein the first support and the second support are configured to move relative to each other in directions away from each other,
   further comprising an elastic body for elastically supporting any one of the first support and the second support in a direction away from the other.

* * * * *